United States Patent
Ma et al.

(10) Patent No.: US 11,983,742 B1
(45) Date of Patent: May 14, 2024

(54) SYSTEMS AND METHODS FOR MODELED ADVERTISEMENT CONVERSION ATTRIBUTIONS

(71) Applicant: Amazon Technologies, Inc., Seattle, WA (US)

(72) Inventors: Sheng Ma, Belmont, CA (US); Jia Chen, Sunnyvale, WA (US); Hancheng Ge, Seattle, WA (US); Paula Despins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/936,603

(22) Filed: Sep. 29, 2022

(51) Int. Cl.
*G06Q 30/02* (2023.01)
*G06N 3/045* (2023.01)
*G06N 3/048* (2023.01)
*G06N 3/08* (2023.01)
*G06Q 30/0242* (2023.01)
*G06Q 30/0251* (2023.01)

(52) U.S. Cl.
CPC ......... *G06Q 30/0269* (2013.01); *G06N 3/045* (2023.01); *G06N 3/048* (2023.01); *G06N 3/08* (2013.01); *G06Q 30/0242* (2013.01); *G06Q 30/0246* (2013.01)

(58) Field of Classification Search
CPC ... G06Q 30/0269; G06Q 30/0246; G06N 3/08
See application file for complete search history.

(56) References Cited

U.S. PATENT DOCUMENTS

| | | | |
|---|---|---|---|
| 2013/0227316 A1* | 8/2013 | Bengtsson | B60L 58/16 713/300 |
| 2020/0193296 A1* | 6/2020 | Dixit | G06N 3/045 |
| 2021/0256555 A1* | 8/2021 | Kitts | G06Q 30/0241 |
| 2022/0083840 A1* | 3/2022 | Luong | G06N 3/088 |
| 2022/0083915 A1* | 3/2022 | Duarte | G06N 20/00 |
| 2022/0129794 A1* | 4/2022 | McGrath | G06F 16/2379 |

OTHER PUBLICATIONS

University of Chicago, "Sample Selection Bias as a Specification Error", James J Heckman, Econometrica January vol. 47 No. 1 pp. 153-161 (Year: 1979).*

* cited by examiner

*Primary Examiner* — Breffni Baggot
(74) *Attorney, Agent, or Firm* — Eversheds Sutherland (US) LLP

(57) ABSTRACT

Systems, methods, and computer-readable media are disclosed for modeled advertisement conversion attributions. An example method may include receiving first input data comprising first advertisement impression data and first advertisement conversion data, wherein the first input data includes one or more user identifiers associated with both the advertisement impression data and advertisement conversion data. The example method may also include training one or more machine learning models using the first input data. The example method may also include receiving second input data comprising second advertisement impression data, wherein user identifiers are unavailable for the second input data. The example method may also include determining, using the one or more machine learning models, second predicted conversion data associated with the second input data.

20 Claims, 13 Drawing Sheets

SYSTEMS AND METHODS FOR MODELED ADVERTISEMENT CONVERSION ATTRIBUTIONS

BACKGROUND

Attribution is a well-known advertising measurement that uses attribution logic to assign credit for a conversion event (e.g., product purchase) to a specific advertisement impression (e.g., a user view of the advertisement) from the same user prior to the conversion event. As an example scenario, a user views a sequence of advertisements promoting a television (a first advertisement, a second advertisement, and a third advertisement) prior to purchasing the television. The first advertisement may have been a sponsored brand television advertisement shown to the user while browsing a first website. The second advertisement may have been an advertisement shown on a second website. The third advertisement may have been an advertisement shown on a third website. Using last view attribution logic, the conversion event may be attributed to the third advertisement given that it was the last advertisement viewed by the user before the purchase.

In the past, the attribution measurements have been computed deterministically using a persistent user identity (e.g. a cookie) to associate advertisement views to conversion events. Having access to a deterministic identity is the foundation for this type of attribution. However, these types of persistent user identities may not always be available, which may lead to difficulties in performing these deterministic attributions between user advertisement views and conversion events.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
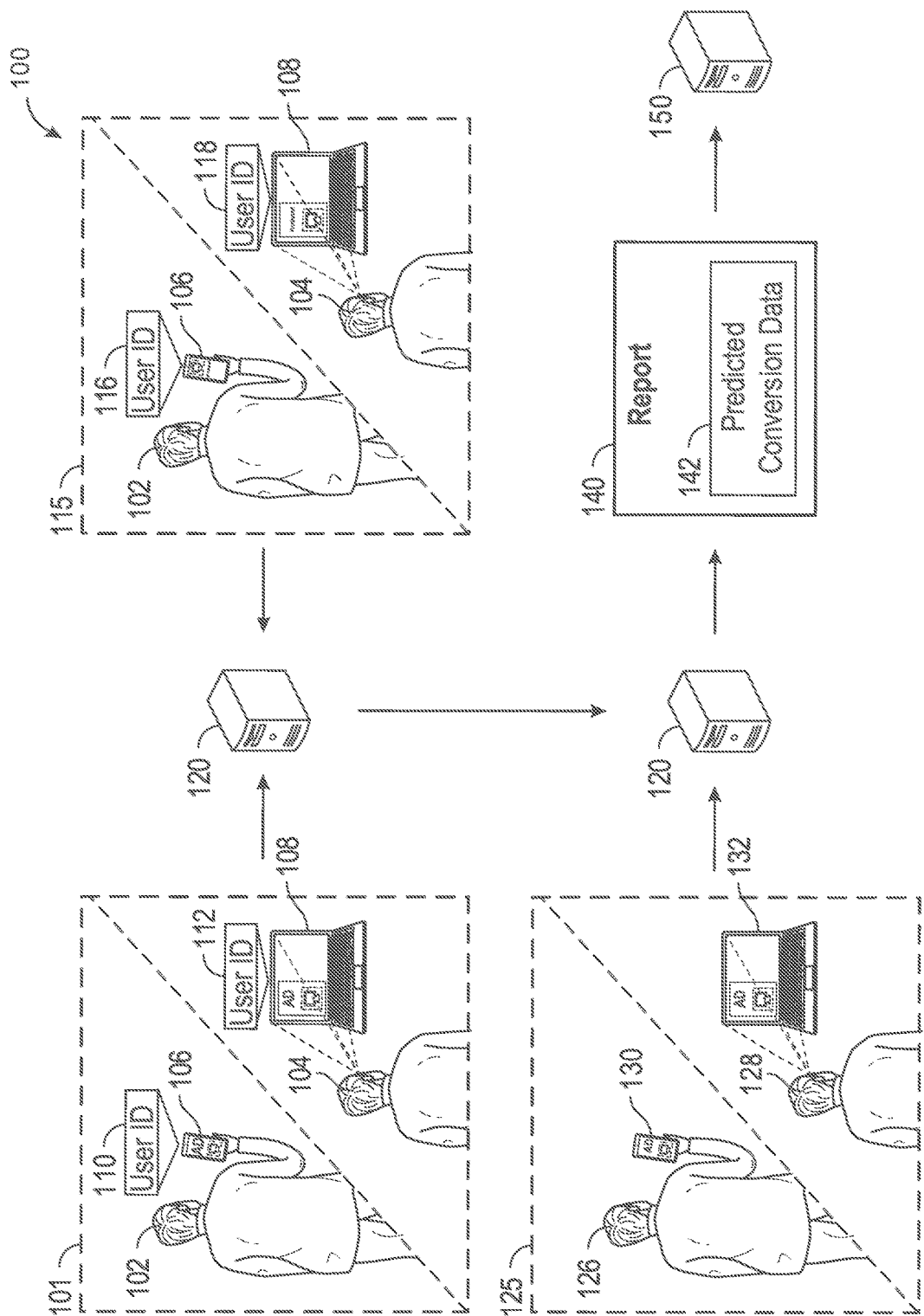
FIG. 1A is a schematic illustration of an example use case for modeling conversion events in accordance with one or more example embodiments of the disclosure.

This disclosure relates to, among other things, devices, systems, methods, computer-readable media, techniques, and methodologies for modeled advertisement conversion attributions. The systems and methods described herein provide at least three improvements to traditional deterministic attribution methods. First, the systems and methods are capable of producing impression-level attribution models without requiring a user identifier (for example, a cookie and/or any other type of user identifier) to be associated with the impression data and/or the conversion event data. As described herein, an "impression" may refer to an instance of a user viewing a product advertisement. Additionally, the term "impression-level" may refer to any modeling that is performed on an individual impression basis. A conversion (also referred to interchangeably herein as a "conversion event" or the like) may be a purchase of a product included in an advertisement, for example. Thus, the systems and methods may predict (the terms "model," "predict," and "estimate" may be used interchangeably herein with respect to any predicted conversion events determined using any models) product purchases that may occur based on one or more advertisements for the products. This allows for the effectiveness of particular advertisements to be measured without requiring any (or only minimal) user identifiers to be associated with any input data as may be required for deterministic attribution methods. Second, the systems and methods may be used to establish ground truth data for use in the modeling without requiring the user identifiers. Third, the systems and methods provide reports including aggregated modeled conversions for a given set of advertisement views without requiring the user identifiers. An example of such a report may include a daily estimated number of conversions for a particular advertisement campaign. The systems and methods may also provide any other benefits described herein.

These benefits may be accomplished by establishing one or more impression-level model(s) with report-level calibration using training data including user identifiers. That is, impression and conversion data that does include associated user identifiers may be used to train the model(s) to be able to predict conversions when provided with only impression data as an input. In some instances, the model(s) may be deep learning models; however, any other type of model as described herein or otherwise may also be used (for example, at least FIGS. 5-6 may provide non-limiting examples of model architectures). The model(s) may then be used to predict conversion events associated with any given number of advertisements. The model(s) may also be used to predict other conversion outcomes including conversion date, conversion count, purchase amount, and/or any other types of conversion outcomes through post-processing. At least FIG. 4 may provide a high-level overview of the operations involved in performing these predictions, including some or all of the model(s) that may be used. As described herein, the term "id-has" may be used to describe data that does include user identifiers and "id-less" may be used to describe data that does not include user identifiers. For example, impressions or conversions that include or do not include associated user identifiers. A user identifier may refer to any mechanism by which particular data may be associated with a user. One example of such a user identifier is a cookie that is stored when the user browses a website.

Figure 9:
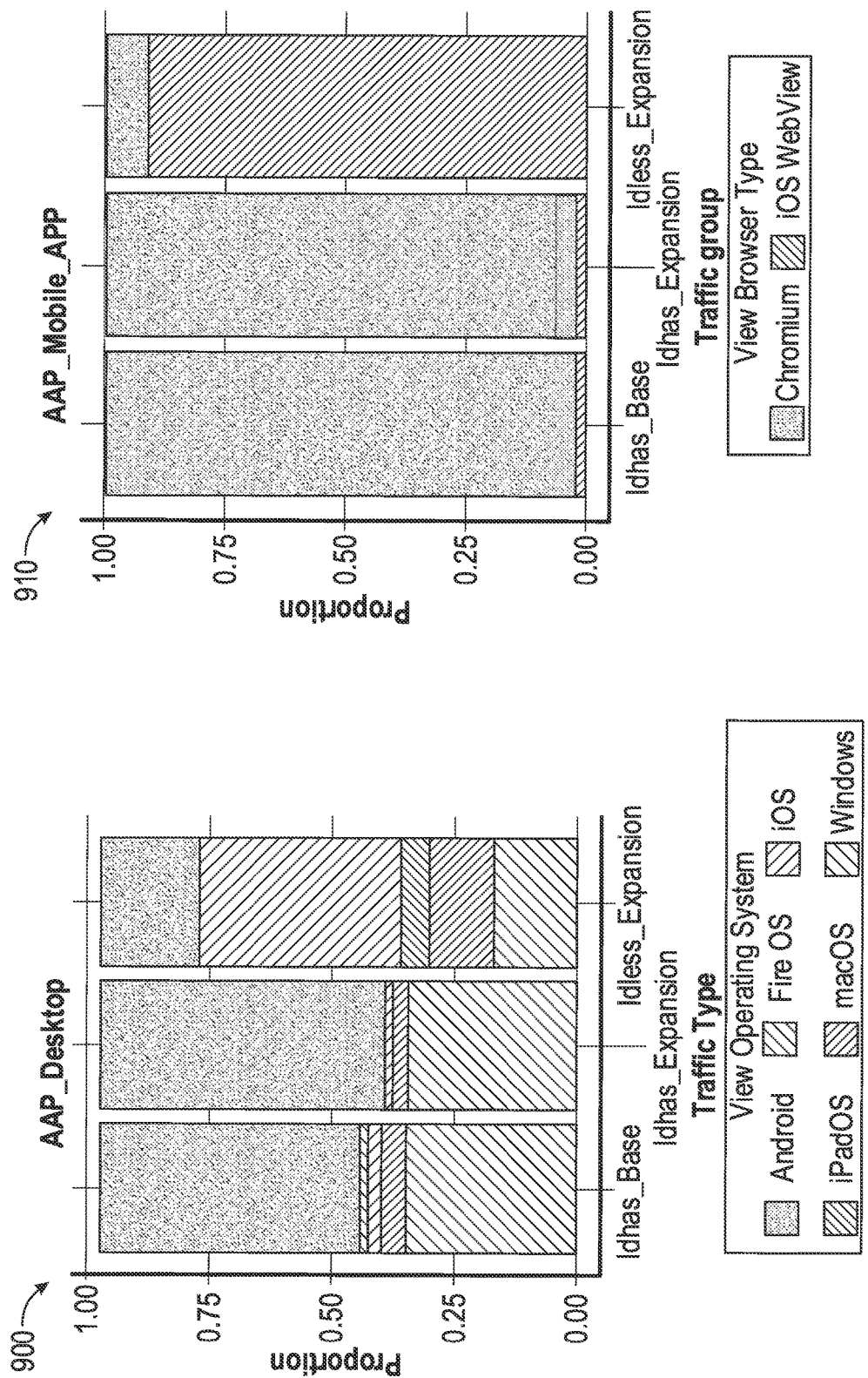
FIG. 9 depicts example data shifts in accordance with one or more example embodiments of the disclosure.

In one or more embodiments, the modeled conversion attributions may be performed by predicting conversion probabilities at the impression level. One challenge with this approach is that the distribution of id-less data might be different from the distribution of id-has data because user identifiers may be associated with some users but may not be associated with other users. Examples of different types of such distribution data shifts may include covariate shift and concept shift. Covariate shift is a specific type of dataset shift often encountered in machine learning and involves a phenomenon where there is a shift in the distribution of input data between the training environment and the live environment. For example, while there may be a specific relationship between impression training data and conversion training data, this relationship (and the impression data and conversion used to determine the relationship) may not necessarily follow the same pattern for data sets that do not include user identifiers. Given this, some or all of the model(s) may need to account for such shifts to accurately predict conversions for a given set of impressions data. Two examples of covariate shifts are illustrated in FIG. 9.

Concept-shift is another type of data shift that includes more control over self-serving user bias. The concept shift is defined as the outcome conditioning on the covariates is different for id-has and id-less given serving differences (e.g. id-has traffic can be targeted and optimized using historical metrics such as previous purchase; idles traffic may not have any historical information and may be targeted and optimized based on the contextual information, which may be less accurate) and self-selection bias (e.g. some users may be reluctant to opt-in for cross-publisher tracking). Given this, the ground truth data that is required to establish concept shift may need to be more controlled. For example, this data may be established through a group of panelist users.

One approach builds the foundation of the counterfactual analysis in economics, which involves assessing the effectiveness of a program or a treatment when randomized, controlled trial (for example, a panel of users in a controlled environment) is not possible. Counterfactual analysis uses the potential outcome framework (Y(T=0), Y(T=1)) where there is a missing data problem. There may be only one outcome by treatment assignment (T), either treated outcome (Y(T=1)) in treatment group (T=1) or non-treated outcome (Y(T=0)) in control group (T=0), but not non-treated outcome (Y(T=0)) in treatment group (T=1).

As applied to the systems and methods described herein, an indication that a user identifier is not associated with particular data may be used as a treatment assignment. The non-treated outcome in the treatment group may be counterfactual attributed conversions based on id-less data. DML models may incorporate advanced machine learning algorithms such as deep neural nets to improve accuracy. DML may involve two first-stage nuisance variable predictions: propensity score prediction and outcome predictions. The former may be used to re-weight outcome prediction using observations from a control group and the latter is used to improve outcome prediction.

Another approach involves the use of transfer learning. In the transfer learning framework, the shift of joint distribution on impression data and conversion data is decomposed into two parts: covariate shift and concept shift. The covariate shift may refer to the shift on the impression distributions (id-has versus id-less), which is the main shift from the id-has to the id-less. In some instances, concept shift (the shift on the probability of conversion conditioned on impressions) may not be considered as the conversion behavior depends on impressions and its contexts. For covariate shift, the key is to bridge the distribution discrepancy between id-has and id-less traffic solved by covariate shift modeling (CSM).

Through importance sampling, the distribution of id-has traffic may be made similar to id-less traffic in the training so that a conversion prediction model may be directly applied to the id-less traffic without bias. The importance weight may be the ratio between the propensity score of an impression belonging to id-less traffic and the propensity score of an impression belonging to id-has traffic. Both approaches, DML and CSM, solve the distribution discrepancy between id-has traffic and id-less traffic through reweighting on impressions. DML and CSM may share two common models: a conversion prediction model and a propensity score model. A conversion prediction model may be trained to predict conversion probability for an impression, while the propensity score model may be trained to predict the probability of the data set from which an impression originates. DML may apply reweighting in the scoring stage, while CSM may apply reweighting in the training stage.

In one or more embodiments, each impression may be denoted as $x_i$ and the corresponding conversion probability prediction may be denoted as $\hat{y}_i$. Given that conversion predictions are performed at the impression-level, the model is flexible and may also be used to obtain aggregated report-level modeled attributed conversions as described herein. For instance, attributed conversions may be modeled for an advertisement j that consists of impressions $\{x_1^{(j)}, \ldots, x_n^{(j)}\}$ by summing them up as $$\sum_{i=1}^{n} x_1^{(j)}.$$

Given this formulation, a conversion prediction model, $h(x)$, may be trained to predict conversion probability, $y_i$, for impression, $x_i$, accurately.

However, ground truth conversions for id-less data may not be available in all cases. To address this, ground truth conversions from the id-has data may be used to train a conversion prediction model. The trained model may then be applied to the id-less data. A data variable "T" may be assigned a value of T=0 for id-has data and a value of T=1 for id-less data. The variable "T" may correspond to the treatment from the self-selection perspective of the domain from the perspective of domain adaptation. Impressions in the id-has data may be denoted as $\{x_1^{T=0}, \ldots, x_n^{T=0}\}$ and impressions in the id-less data as $\{x_1^{T=1}, \ldots, x_n^{T=1}\}$, where n and m may represent the amount of impressions. If a conversion prediction model is trained using id-has traffic without distribution correction for id-less traffic, the model may be denoted as h(x; T=0). Additionally, h(x; T=1) may be used to represent the conversion prediction model trained using id-has traffic with distribution correction for id-less traffic. Under the self-selection perspective, h(x; T=0) may be used to provide a biased prediction, and a DML aggregator may be derived to correct the bias for reporting. Under the domain adaptation perspective, we train h(x; T=1), may be trained using id-has traffic by importance sampling and applying a simple sum aggregator on the unbiased predictions for reporting.

From the self-selection perspective, the id-less measurement problem may be formulated in a potential outcome framework, and the missing conversions may be added as if those impressions were included in the id-has data. In general, the missing data mechanism may not be random when user identifiers are not available, which may be referred to as self-selection. The parameter of interest may be:

$$\theta_o = E[Y(0)|T=1] \qquad \text{(Equation 1)}$$

Where Y(0) may denote potential attributed conversions if impressions data includes id-has data. In some cases, this data may not be observed when impressions are of id-less data. There are two assumptions that may be required for DML. The first assumption may include (A1)Y(1), Y(0)⊥T|X and the second assumption may include (A2)Y (1)=Y(0).

A1 may denote the conditional independence where potential attributed conversions are independent of id-less traffic that is conditional on application and/or web browsing behaviors, geo, device, and web contexts. A2 may assume no treatment effect that potential attributed conversions from the id-has traffic (Y(0)) are the same as ones from the id-less traffic (Y(1)). The following estimator may be derived using a Neyman orthogonal score from estimate $\theta_o$.

$$\hat{\theta} = \frac{1}{m} \left( \sum_{i=1}^{m} h(x_i^{T=1}; T=0) + \sum_{i=1}^{n} \frac{m(x_i^{T=0})}{1-m(x_i^{T=0})} \left( y_i^{T=0} - h(x_i^{T=0}; T=0) \right) \right) \qquad \text{(Equation 2)}$$

DML may use two machine learning models to learn two nuisance variables (the DML may also use any other number of machine learning models and may learn any other number of nuisance variables). The bias of the nuisance variables may then be corrected in the DML aggregator. The two nuisance variables may include propensity score $p(T=1|x_i)=m(x_i)$ and conversion outcome $P(Y|t_i=0, x_i)=h_i(x_i;T=0)$. $\hat{\theta}$ may then be the average attributed conversions for id-less users at the reporting grain. To learn the propensity score model $m(x_i)$, a binary classification problem may be used (for example, id-has data versus id-less data), and cross-entropy loss may be used to train the propensity score model based on Equation 3.

$$L_{propensity} = \sum_{i=1}^{n+m} \left( t_i \log m(x_i^{T=1}) + (1-t_i) \log(1 - m(x_i^{T=0})) \right) \qquad \text{(Equation 3)}$$

While reference may be made herein to a binary outcome, DML is not limited to necessarily limited to a binary outcome. For binary conversion outcome, cross-entropy loss may be used on the id-has sample as shown in Equation 4.

$$L_{idhas} = \sum_{i=1}^{n} \left( y_i \log h(x_i^{T=0}; T=0) + (1-y_i) \log(1 - h(x_i^{T=0}; T=0)) \right) \qquad \text{(Equation 4)}$$

From the domain adaptation perspective, decomposition of the joint distribution of impression and conversion may first be performed by p(x, y|T)=p(y|x,T)p(x|T). This may result in two different types of data shift. A first type of data shift may include covariate shift, which may be defined by p(x|T=1)≠p(x|T=0), where x refers to the (ad, context, device, . . . ). In the modeled attribution of id-less traffic, an example of covariate shift is the change on geo or ad type distribution change. A second type of data shift may include concept shift, which may be defined by p(y|T=1)≠p(y|T=0). Given that the conversion probability may only depend on the impression and its context, concept shift may not need to be used, and p(y|x) may be used for simplicity. Assuming that concept shift does not exist, the empirical risk minimization on the target domain may be written as:

$$L_{id-less} = \sum_{i=1}^{n} \frac{p(x_i | T=1)}{p(x_i | T=0)} \qquad \text{(Equation 5)}$$

$$\left( y_i^{T=0} \log h(x_i^{T=0}; T=1) + (1 - y_i^{T=0}) \log(1 - h(x_i^{T=0}; T=1)) \right)$$

This may be based on the id-has data $(x_1, y_1), \ldots, (x_n, y_n)$. Importance sampling may be conducted using the ratio $$\omega_i = \frac{p(x_i | T=0)}{p(x_i | T=1)}$$

to reweight the training data from id-has traffic to make the distribution similar to id-less traffic. The inverse propensity score weight $$\frac{p(T=0 | x)}{p(T=1 | x)}$$

is another way to estimate the ratio with a difference constant multiplier $$\frac{p(T=1)}{p(T=0)}$$

using Bayes formula:

$$L_{id-less} = \frac{p(T=0)}{p(T=1)} \sum_{i=1}^{n} \left( \frac{m(x_i^{T=0})}{1-m(x_i^{T=0})} \right)$$ (Equation 6)

$$(y_i \log h(x_i; T=1) + (1-y_i) \log(1-h(x_i; T=1)))$$

Equation 3 may also be used to learn the propensity score $p(T|x)$ that is used in Equation 6.

Behind both self-selection perspective and domain adaptation perspective, there may exist two models: a conversion prediction model $h(x; T)$ and a propensity score model $m(x)$. A deep neural network architecture used for these two models may first be introduced. Following this, the train and test flow may be introduced. The first model may be a conversion prediction model $p(y|x)$, which may predict a probability of a conversion "y" given an impression "x." The second model may be a propensity score model $p(T|x)$, which may predict probability of data "T" given impression "x." The features used in the conversion prediction model and the propensity score model may have overlap as the same deep neural network architecture may be used for both models.

In one or more embodiments, the machine learning system described herein may employ deep neural networks (DNN) to predict conversions based on a set of impression features. The machine learning system may use report-level calibration to improve performance at the report-level and may also use conversion outcome models to determine predictions for different conversion outcomes. There may be a number of different challenges associated with building a machine learning system from the impression-level. (1) Report-level accuracy: a report may be the summation of impression conversion estimates over impressions in a report unit over a time span (e.g., conversion count by each advertisement identifier in a daily report). The report-level accuracy may need to be optimized for the impression-level model. (2) Multiple conversion outcomes: multiple outcomes may need to be supported (examples are provided above), for example, integer or real-valued. These outcomes may be zero-inflated heavy tail distributions as most impressions may have no associated conversion data. (3) Conversion delay: conversions may be attributed to an impression in a 14-day window (or any other time window). (4) Daily traffic update: the production system may need to handle daily traffic, update models when receiving new conversions, and generate updated daily reports.

Given these challenges, the systems and methods described herein may involve the following advantages. An impression-level model may be built to predict conversions of an impression followed by a report-level calibration to achieve significant improvement at report-level with the consideration of the data sparsity. A two-stage approach may be used. The first stage may involve predicting whether an impression will have a conversion or not (e.g., binary classification problem), followed by predicting other outcomes conditioned on conversion (e.g., regression problem). This may solve the zero-inflated regression problem. A train/test protocol may be used to perform an effective trade-off between waiting for delayed conversions and producing reports in a timely manner. Any models may continuously be trained with new data and to update predictions to improve report accuracy.

The goal of a machine learning system aims to generate accurate reports to provide to advertisers to provide the advertisers with information about advertisement performance. This problem is addressed by training up an impression-level prediction model, mapping predicted probabilities to outcomes, and summing up the probabilities to create reports of given impressions in a customized time period. Mathematically, the modeled attribution at report unit U (e.g., the impressions from one advertisement identifier or the advertiser-specified impression set) may be the summation of outcome metric y (e.g., conversion units or sales) up to time T on all the impressions under report unit $x \in U$ as shown in Equation 7.

$$U \rightarrow \sum_{x \in U} \mathbb{E}[y | x, t_y \leq T]$$ (Equation 7)

Where $t_y$ may be the conversion time when outcome metric y occurred, and T may represent as the query time set by advertisers when generating the report. It should be noted that multiple conversions associated with the same impression x can happen before query time T. In some instances, the query time T may be the latest day and advertisers will query the report daily after an advertisement campaign starts. To compute Equation 1, an impression-level model may be used to predict the expectation of the outcome per impression in a certain time period, as shown in Equation 8.

$$\hat{y} = \mathbb{E}[y | x, t_y \leq T]$$ (Equation 8)

$$= \mathbb{E}[y | x, \Delta t \leq \Delta T] \stackrel{def}{=} \mathbb{E}[y | x, \Delta T]$$ (Equation 9)

Where $\Delta t = t_y - t_x$ is the time gap between conversion time $t_y$ and impression time $t_x$. From Equation 2 and Equation 3, a change from report query time T on advertiser side to the conversion attribution window $\Delta T$ on the modeling side may be performed. The attribution window $\Delta T$ may vary across impressions by $\Delta T = \min(T - t_x, 14)$, where 14 is the full attribution window (however, any other value may be used instead to represent any other attribution window). For example, if an impression is shown at $t_x = T - 3$, attribution window $\Delta T = 3$ may be considered in conversion modeling for this impression. This may be because advertisers may not expect to see predictions of future conversions in the report. This makes prediction for report different from ad response prediction for bidding and pricing. Since $\Delta T$ may be smaller than the full attribution window, it can also be interpreted as partial attribution window. For the same query time T, a partial attribution window $\Delta T$ may be different for impressions that are shown on different impression time $t_x$. For the same impression, partial attribution window $\Delta T$ may also change along with query time T as advertisers may query their ad performance on different days to get up-to-date report. To handle all these use cases, the outcome metric y may be modeled with respect to all the partial attribution windows ranging from 1-day to 14-day (full attribution window).

$$\hat{y} = [\mathbb{E}[y|x, \Delta T=1], \mathbb{E}[y|x, \Delta T=2], \ldots, \mathbb{E}[y|x, \Delta T=14]]$$ (Equation 10)

where $\hat{y}$ is denoted as all outcomes corresponding to an impression x. Once the prediction of conversion outcome for all 14 attributions windows is obtained, the attribution window for reporting may be selected depending on the query time of advertiser. For example, if an impression is shown on day T−3, $[y|x, \Delta T=3]$ may be reported for the advertiser query on day T, and $\mathbb{E}[y|x, \Delta T=4]$ may be reported for the advertiser query on day T+1. For each partial attribution window $\Delta T$, [y|x, $\Delta T$] is formulated as a regression problem of predicting the outcome metric y. Three outcomes may be estimated: (1) conversion count, which may refer to the number of purchase orders or detail page views (DPV), (2) conversion units, which may refer to the number of product purchases, and (3) conversion sales (e.g., dollar amount). In some embodiments, all outcome metrics are 0 if there is no conversion. The target value of this regression problem may be inflated with zeros as the conversion rate may be very small (e.g. <1%). As a result, directly modeling all outcomes may need to deal with multiple zero-inflated outcome distributions. This may require a complex multi-head DNN structure. To simplify this, a two-stage modeling methodology is used that decouples the problems into two sub-problems: (1) conversion or not sub-problem and (2) outcome in partial attribution window sub-problem. One intermediate variable $p(y>0|x, \Delta T=14)$ may be is the probability of whether there is at least one conversion within the full attribution window.

In one or more embodiments, the conversion prediction model maps from the impression to an intermediate variable:

$$x \to p(y>0|x, \Delta T=14) \quad \text{(Equation 11)}$$

This may be a binary classification problem in the same (or similar) formulation as the CVR problem in ad response prediction. The outcome model in partial attribution window may maps from the intermediate variable to the outcome metric y with respect to all the partial attribution windows.

$$p(y>0|x, \Delta T=14) \to [\mathbb{E}[y|x, \Delta T=1], \ldots, \mathbb{E}[y|x, \Delta T=14]] \quad \text{(Equation 12)}$$

This may be a regression problem with monotonic constraints that $\mathbb{E}[y|x, \Delta T=i] \leq \mathbb{E}[y|x, \Delta T=j]$ for all i<j.

The modeled attribution methodology aims to address two measurement problems. First, the methodology may model conversions where deterministic attributions cannot be determined. Second, the methodology may model id-less traffic that may not be deterministically attributed. In some cases, propensity scores may be used to simulate the id-less traffic with conversions and impressions from id-has traffic.

In terms of data, users may be split into two groups, one group including pseudo user identifier data and one group as not including identifier data. The dataset may include 14 days of impression data (or any other time range, depending on the attribution window) with conversions fully attributed. In this dataset, the exact conversion date for each conversion may also be included. The training window may comprise of all the 14 impression days (or any other time frame) and the test window may include the last seven impression days (or any other time frame). The training data may include the impressions within a training window shown to the pseudo-opt-in user group. The test data may include the impressions within test window shown to the group of users, not including user identifiers. This may be used to simulate the situation that the model is trained on the latest 14 days of data from id-has traffic and predicts on the latest seven days of data from id-less traffic.

To evaluate the report-level performance, an absolute percentage error (APE) and percentage error (PE) may be calculated at the advertisement identifier report unit. Mean and certain percentiles (for example, $50^{th}$, $70^{th}$, and $90^{th}$-percentiles) of APE may be calculated over the reports.

The estimated conversions of a report (e.g. conversions of an advertisement identifier for a report duration) may be the summation of the conversion estimates of impressions in the report. A two-step approach may be used: (1) the impression-level prediction model so as to be sensible to impression features and (2) the report-level calibration so as to calibrate the impression estimates to achieve the report-level goal.

Figure 6:
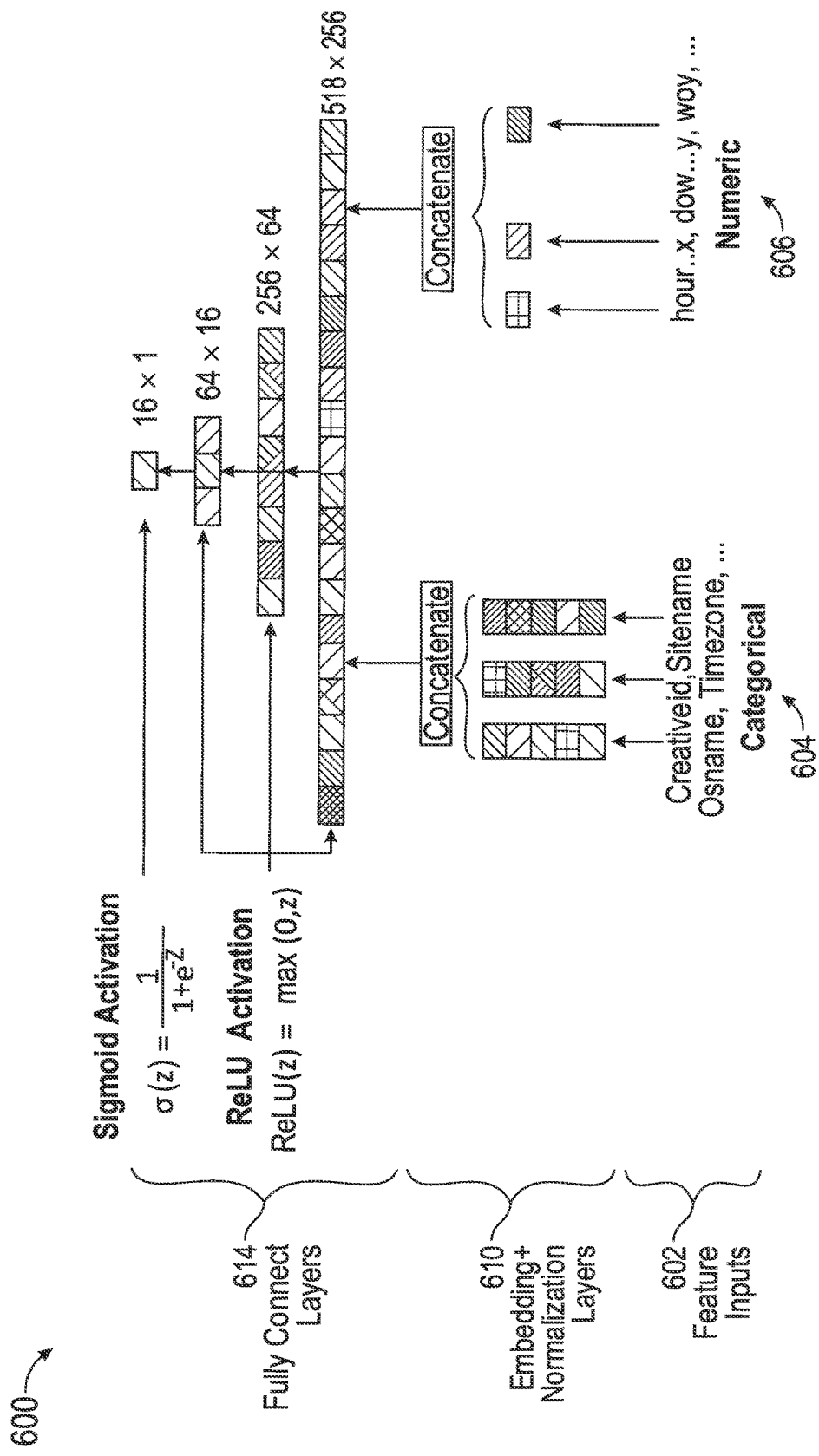
FIG. 6 depicts an example deep neural network (DNN) architecture in accordance with one or more example embodiments of the disclosure.

In one or more embodiments, the impression-level prediction model may be a DNN, which may be a multi-layer perceptron (MLP) with ReLU activation fed by an encoding layer to capture complex feature interactions (an example may be illustrated in FIG. 6). Similarly, three hidden layers may be used and the hidden size may be set to [256, 64, 16], respectively for each layer (or any other values). In each layer, a dropout with the ratio of 0.2 (or any other value) may be used to avoid overfitting. For the final layer, one fully connected layer with a sigmoid activation may be used to generate the probability of conversion. Platt Scaling may be applied to calibrate predicted conversion probabilities at the impression-level due to the negative down-sampling applied in the training data, which trains a logistic regression model on a classifier's predicted probabilities (widely adopting logits) with class labels. Let f(x) represent the output logit generated by DNN model for an impression. Platt Scaling computes the calibrated estimate of the impression as:

$$p(y=1|x) = \frac{1}{1 + \exp(w * f(x) + b)},$$

where w is the parameter for logit f(x), and b is a bias term.

The machine learning system aims to provide accurate estimates for a report. The calibrated impression level estimates above can be further calibrated based on the report-level observations. Let $\Theta(i)$ be the estimated conversions for the i-th item in a report unit (e.g., the i-th ad), N be the number of ad impressions in the scoring window, $x_k$ be the feature for an impression k for report i, $y_k$ represents whether an advertisement impression k comes up with at least a conversion, then:

$$\Theta^{(i)} = \sum_{k=1}^{N} (p(y_k > 0 | x_k, \Delta T = 14) \quad \text{(Equation 13)}$$

The ratio of propensity scores may be simplified to 1 in some cases (for example, without covariate shift) to produce:

$$\widehat{\Theta}^{(i)} = \sum_{k=1}^{N} \Big( p(y_k > 0 | x_k, \Delta T = 14) + \underbrace{\mathbb{E}_M[\mathbb{1}[y > 0] - p(y > 0 | x, \Delta T = 14)]}_{\text{report - level adjustment term}} \Big) \quad \text{(Equation 14)}$$

Where $\widehat{\theta^{(i)}}$ is the updated conversions by taking into account the report-level adjustment, and EM is the empirical mean operator on the calibration dataset. The second term listed above may be used to compute the adjustment on conversion rate p(yk>0|xk, $\Delta T$=14) for an impression k to correct for the report-level residual error computed from the calibration dataset.

In one or more embodiments, a non-parametric report-level model may be used. The same outcome value may be predicted for all converted impressions within one advertisement (for example, report-level), and the value may be estimated by the expectation of the outcome value within each advertisement line. This can be implemented by a lookup table in which the key is an advertisement identifier. The expectation may be robustly estimated with data of each advertisement, and the lookup table may only store large ads that have enough conversions (>10) to handle small advertisements as well. Lookup tables may be built at the campaign level, advertiser level, and marketplace level with the hierarchy fallback mechanism of ad→campaign→advertiser→marketplace.

Additionally, a non-parametric impression-level model may also be used. A gradient-boosted decision tree may be used to predict the impression-level outcome value for each converted impression. This may be fine-grained and can handle non-linear interaction between features. In some instances, the impression-level model performs better on DPV since DPV outcome distribution has larger variance. The report-level model may perform better on purchase as purchase outcome distribution may have smaller variance.

In one or more embodiments, the empirical CDF may be directly estimated for each advertisement. Similar to the non-parametric approach, the same hierarchy chain may be used to handle the case that there is insufficient data to get robust empirical CDF for small advertisements.

Additionally, any of the impression-level modeled conversion data may be aggregated into reports that may allow users (for example, advertisers) to understand how advertisements may impact conversion events. For example, a first advertisement may have ten attributed conversions out of ten thousand advertisement impressions, a second advertisement may have 20 attributed conversions out of ten thousand advertisement impressions, and a third advertisement may have attributed conversions out of 10 thousand impressions. Based on the predicted conversion data, the advertiser may conclude that the third advertisement may have been shown more as the last advertisement before user purchases. The reports assist advertisers in assessing the effectiveness of any given advertisement campaigns, and thus allows them to optimize their advertisement campaign performance.

In contrast with traditional type of conversion reporting, the systems and methods described herein also allow for information about multiple potential conversion outcomes to be included in the report. That is, while traditional reporting methods may involve providing "binary" information about whether a conversion occurred or did not occur, the methods described herein may provide more granular information. Examples of this more granular information may include a number of conversions, units purchased, a purchase amount, a specific purchase date, and/or any other types of additional data points beyond a mere indication of whether the purchase occurred. Thus, the reporting method may involve at least two steps: the "binary determination" (e.g., a determination by the model as to whether conversion(s) are predicted to occur) and the "multiple outcome determination" (e.g., more specific conversion information produced by the model about the predicted conversion(s)). The machine learning model and associated method is described in additional detail with respect to at least FIGS. 3-4.

Referring to FIG. 1A, an example use case 100 illustrating an example of modeling conversion events is depicted in accordance with one or more example embodiments of the disclosure. The use case 100 illustrates a high-level example of a manner in which one or more model(s) may be trained such that conversion events may be predicted event if impression data does not include user identifiers. It should be noted that this use case 100 is not intended to illustrate all of the steps involved in performing the predictions but is merely intended to provide a depiction of some of the general steps involved in the process. Additional details are provided below with respect to the remaining figures.

The use case 100 begins with scene 101, which depicts two different users, user 102 and user 104. The scene 101 shows that user 102 is viewing an advertisement for a new television that is displayed on a mobile device 106. The scene 101 also shows that user 104 is separately viewing an advertisement for the television on a laptop computer 108. The advertisements may be the same advertisements or different advertisements. The scene 101 also illustrates the existence of user identifiers associated with the two users (for example, user identifier 110 for user 102 and user identifier 112 for user 104). For the purposes of this use case 100, the users may be browsing websites that present the advertisements, and the user identifiers may be cookies that are stored based on the usage of the websites. However, the user identifiers may also include any other type of user identifier as well.

The use case 100 also includes scene 115, which depicts two conversion events associated with the television being presented in the advertisements illustrated in scene 101. For example, the scene 115 shows the first user 102 purchasing the television using the mobile device 106. The scene 115 also shows the second user 104, purchasing the television using the laptop computer 108. Both of these conversion events are also associated with user identifiers for the user 102 and the user 104 as well (for example, user identifier 116 and user identifier 118). In some instances, the user identifier 116 and user identifier 118 may be the same user identifier as user identifier 110 and user identifier 112. However, the user identifiers may also be different types of user identifiers as well.

The use case 100 next shows that all of this information shown in scene 101 (for example, the indication that the user 102 and the user 104 viewed the advertisements for the television, as well as the user identifiers associated with both users) is provided to one or more model(s) 120. Additionally, all of the information shown in scene 115 (for example, indications of the conversion events, as well as the user identifiers associated with both users) is also provided to the one or more model(s) 120. These model(s) 120 may include machine learning models, such as deep neural networks (DNN). The model(s) 120 may also include any other number of different types of models as well. The model(s) 120 may then be trained using all of this input data, including associated user identifiers (this may be the "id-as" data mentioned herein).

The use case 100 proceeds to scene 125, which depicts two additional users (for example, user 126 and user 128) viewing advertisements for a television. These may be the same users as user 102 and user 104 or may be different users. The two users are shown as viewing the advertisements through mobile device 130 and laptop computer 132, respectively. These may be the same as mobile device 106 and laptop computer 108 or may also be different devices. Additionally, although the use case 100 only depicts mobile devices and laptop computers as being used to view advertisements, any other number and/or combination of different types of devices may also be used to view the advertisements. In contrast with scene 101, scene 125 shows that there are no user identifiers associated with user 126 and user 128. Thus, the identity of user 126 and user 128 may not be tied to the advertisement views in scene 125.

The use case 100 proceeds with the information from scene 125 being provided to the one or more model(s) 120, which are now trained using the data produced in scenes 101 and 115. Using the data produced in scene 125 ("id-less" data as mentioned herein), the model(s) 120 predicts conversion events that may occur. For example, the one or more model(s) 120 may predict that two purchase events for the television (and/or any other number of purchase events) may occur in the future. The model(s) 120 may also be configured to provide more granular information, such as conversion date, conversion count, purchase amount, and/or any other types of conversion outcomes.

Following the conversion modeling performed by the model(s) 120, one or more report(s) 140 may be generated. The report(s) 140 may include the output of the model(s) 120, including any predicted conversion data 142. Particularly, the report(s) 140 may include aggregated data, including predicted conversions for a dataset including a number of different observed advertisement impressions. The report(s) 140 may be provided to a system 150, which may be, for example, a system 150 associated with an advertiser responsible for producing the television advertisements. Thus, the advertiser may be able to view the reports to determine the effectiveness of an advertisement campaign, even if user identifiers are not available to perform a deterministic attribution between a given conversion and an advertisement impression.

Figure 1B:
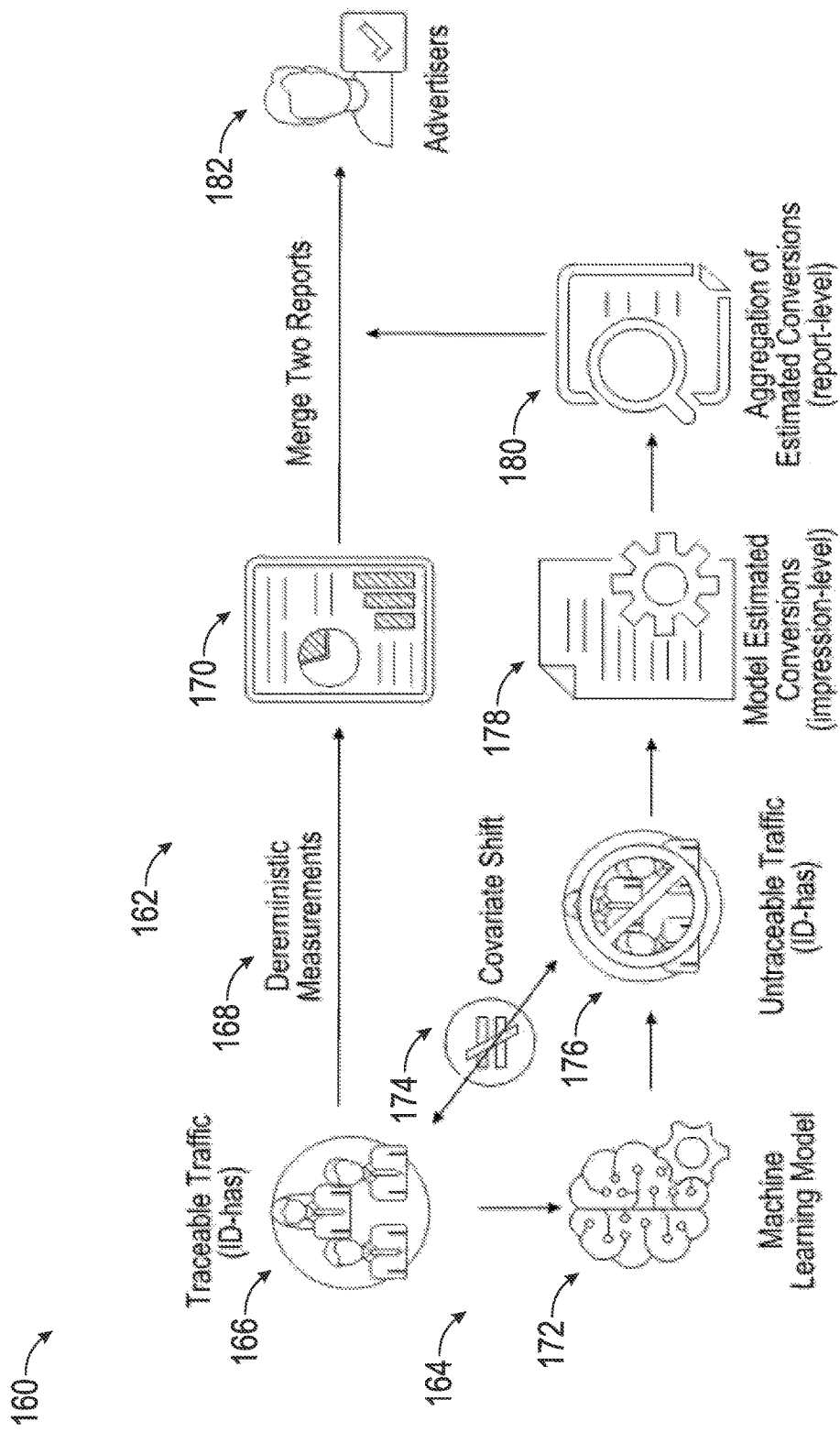
FIG. 1B is a schematic illustration of an example flow diagram for modeling conversion events in accordance with one or more example embodiments of the disclosure.

FIG. 1B is a schematic illustration of an example flow diagram 160 for modeling conversion events in accordance with one or more example embodiments of the disclosure, conversion date, conversion count, purchase amount, and/or any other types of conversion outcomes. The flow diagram 160 illustrates a comparison between the prior approach (for example, shown in the first branch 162 of the flow diagram 160) that may be used when user identifiers were available for the impression data and the conversion data (deterministic attributions as described herein) and the approach described herein (for example, shown in the second branch 164 of the flow diagram 160).

Beginning with the prior approach shown in the first branch 162, operation 166 includes receiving input data with associated user identifiers for both the advertisement impressions and the advertisement conversions. Operation 168 involves using deterministic attribution between a conversion event associated with a user and a most recent advertisement impression for the same user. That is, the conversion event is tied to the most recent advertisement that was viewed by the user. Finally, operation 170 involves generating one or more reports 170 based on the deterministic attributions. This is a simplified approach that may require user identifiers to be associated with all of the input data.

In contrast, branch 164 may involve a scenario where some or all of the input data does not include associated user identifiers Similar to branch 162, branch 164 may begin with operation 166. That is, input data with user identifiers may initially be obtained. This data may then be used in operation 172 to train one or more model(s). These model(s) may be machine learning models and may, more particularly, be DNNs and/or any other types of models. The architecture of the model(s) and the processes associated with the training are described in additional detail below.

The model(s) may also be trained to account for data distribution shifts that may occur between id-has and id-less data. For example, operation 174 shows a covariate shift between the id-has and the id-less data being considered. As described in additional detail herein, the distribution of different types of input data may not necessarily be the same for the id-has and the id-less data due to various different types of phenomena, such as self-selection bias. Thus, the model(s) may need to be trained to account for these data shifts in order to effectively perform conversion predictions based on impression input data.

Once the model(s) are trained using the input data, including user identifiers, operation 176 may involve receiving subsequent input data where some or all of the subsequent input data does not include user identifiers. Based on this input data, operation 178 may involve using the trained model(s) to perform conversion predictions. That is, the model(s) may model conversion events that may occur based on a given dataset of impression events, even if the conversion data is not provided.

Following operation 178, operation 180 may involve aggregating any predicted conversion data generated through iterations of operation 178. This aggregated data may then be provided to a third party, such as an advertiser, at operation 182.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
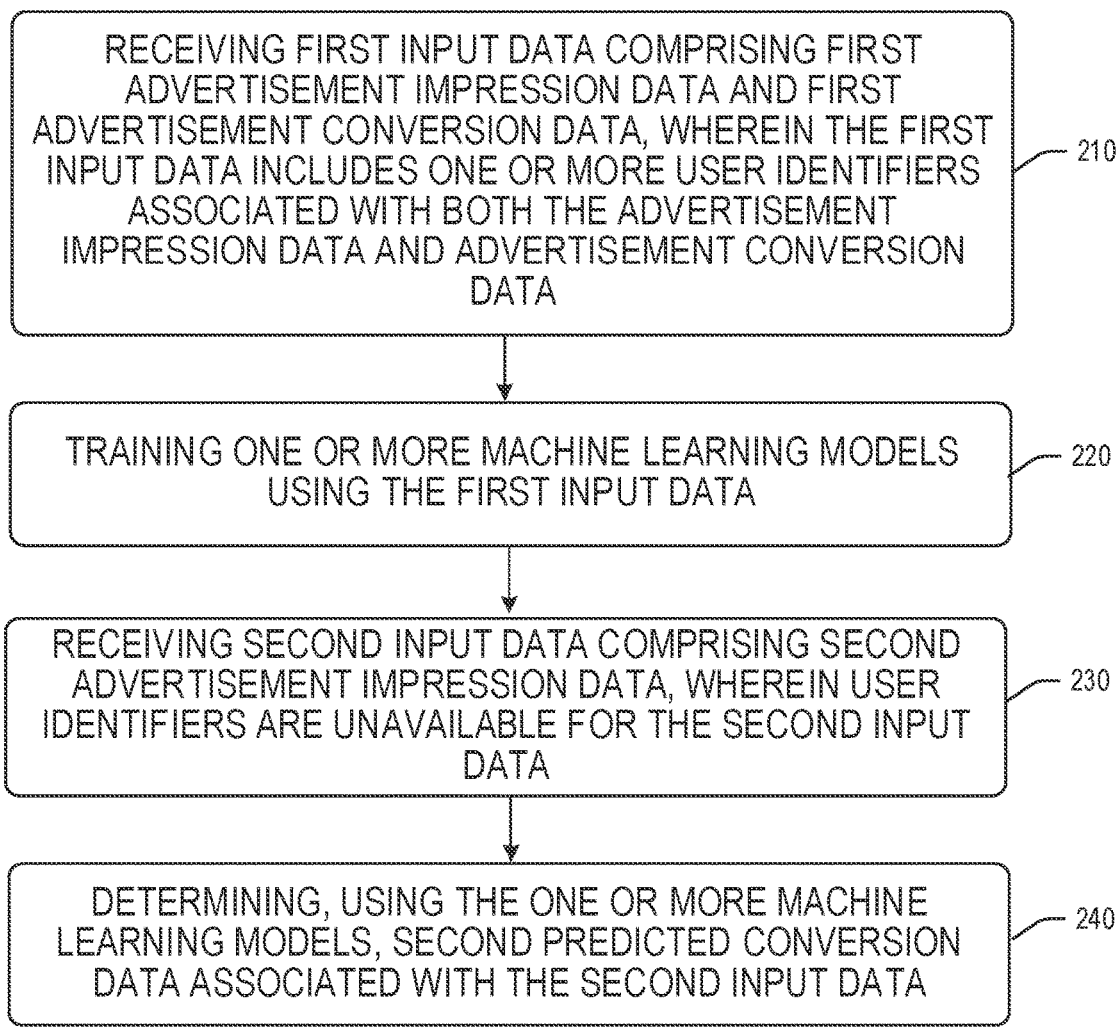
FIG. 2 depicts an example process flow for modeling conversion events in accordance with one or more example embodiments of the disclosure.

FIG. 2 depicts an example process flow 200 for generation and presentation of dynamic product summary images in accordance with one or more example embodiments of the disclosure. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as computing device 1200 and/or any other device, may be executed to receive first input data comprising first advertisement impression data and first advertisement conversion data, wherein the first input data includes one or more user identifiers associated with both the advertisement impression data and advertisement conversion data. At block 220 of the process flow 200, computer-executable instructions stored on a memory of a device, such as computing device 1200 and/or any other device, may be executed to train one or more machine learning models using the first input data. At block 230 of the process flow 200, computer-executable instructions stored on a memory of a device, such as computing device 1200 and/or any other device, may be executed to receive second input data comprising second advertisement impression data, wherein user identifiers are unavailable for the second input data. At block 240 of the process flow 200, computer-executable instructions stored on a memory of a device, such as computing device 1200 and/or any other device, may be executed to determine, using the one or more machine learning models, second predicted conversion data associated with the second input data.

One or more operations of the methods, process flows, or use cases of FIGS. 1-2 may have been described above as being performed by a user device, or more specifically, by one or more program module(s), applications, or the like executing on a device. It should be appreciated, however, that any of the operations of the methods, process flows, or use cases of FIGS. 1-2 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-2 may be described in the context of the illustrative devices; it should be appreciated that such operations may be implemented in connection with numerous other device configurations.

Figure 3:
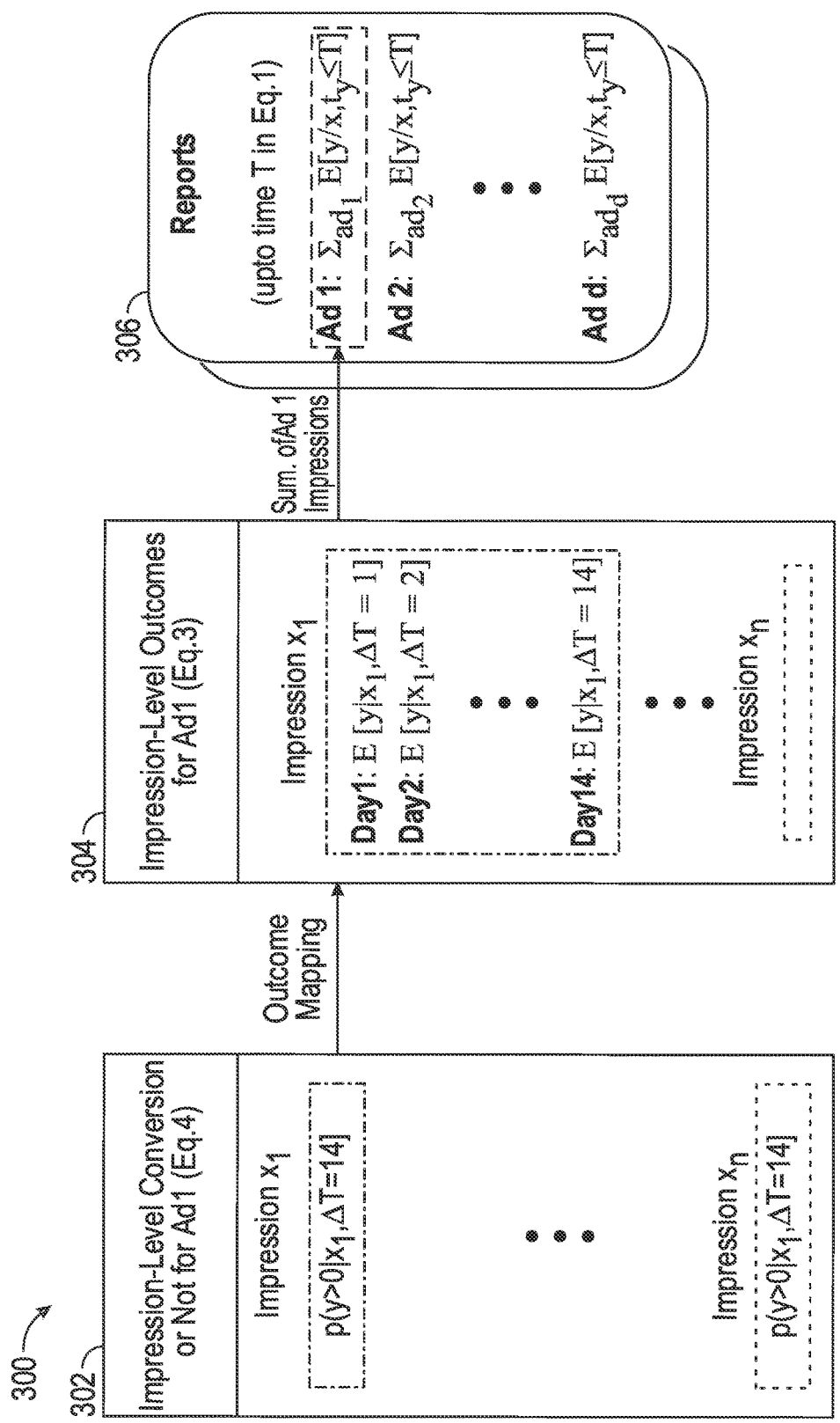
FIG. 3 depicts an example conversion predicting and reporting flow diagram in accordance with one or more example embodiments of the disclosure.

FIG. 3 depicts an example conversion predicting and reporting flow diagram 300 in accordance with one or more example embodiments of the disclosure. Specifically, the flow diagram 300 illustrates example high-level outputs of the model(s) used for conversion prediction as described herein.

Operation 302 involves generating predicted impression-level conversion data. Impression-level conversion data may provide an indication if an advertisement impression is predicted to result in a conversion event. That is, "impression-level" may mean that conversion data may be predicted for individual advertisement impressions (however, predicted conversion data for groups of advertisement impressions may also be performed as well). As described herein, this may be referred to as a "binary" value, which may simply refer to a value that may have one of two possible values (either the impression is estimated to result in a conversion event or the impression is estimated to not result in a conversion event).

Operation 304 involves generating impression-level outcomes for the modeled impression-level conversion data. While the modeled impression-level conversion data determined through operation 302 merely indicates whether an impression is predicted to result in a conversion, the impression-level outcomes may provide more granular information about the estimated conversions. For example, conversion outcomes may include a number of units purchased, a purchase amount, a specific purchase date, and/or any other types of additional data points beyond whether the purchase occurred. These conversion outcomes may provide additional pertinent information to an advertiser regarding their advertisement campaigns.

Finally, operation 306 may involve generating one or more reports, including aggregated predicted conversion data for a given impression dataset. That is, any of the predicted conversion data for a given set of impression data may be compiled into a report that may then be provided to an advertiser (or any other user) such that the predicted conversion data may then be viewed. The aggregated data may allow the advertiser to determine an overall effectiveness of a specific advertisement or a group of advertisements comprising an advertisement campaign. However, the reports may also include more granular information to be viewed as well.

Figure 4:
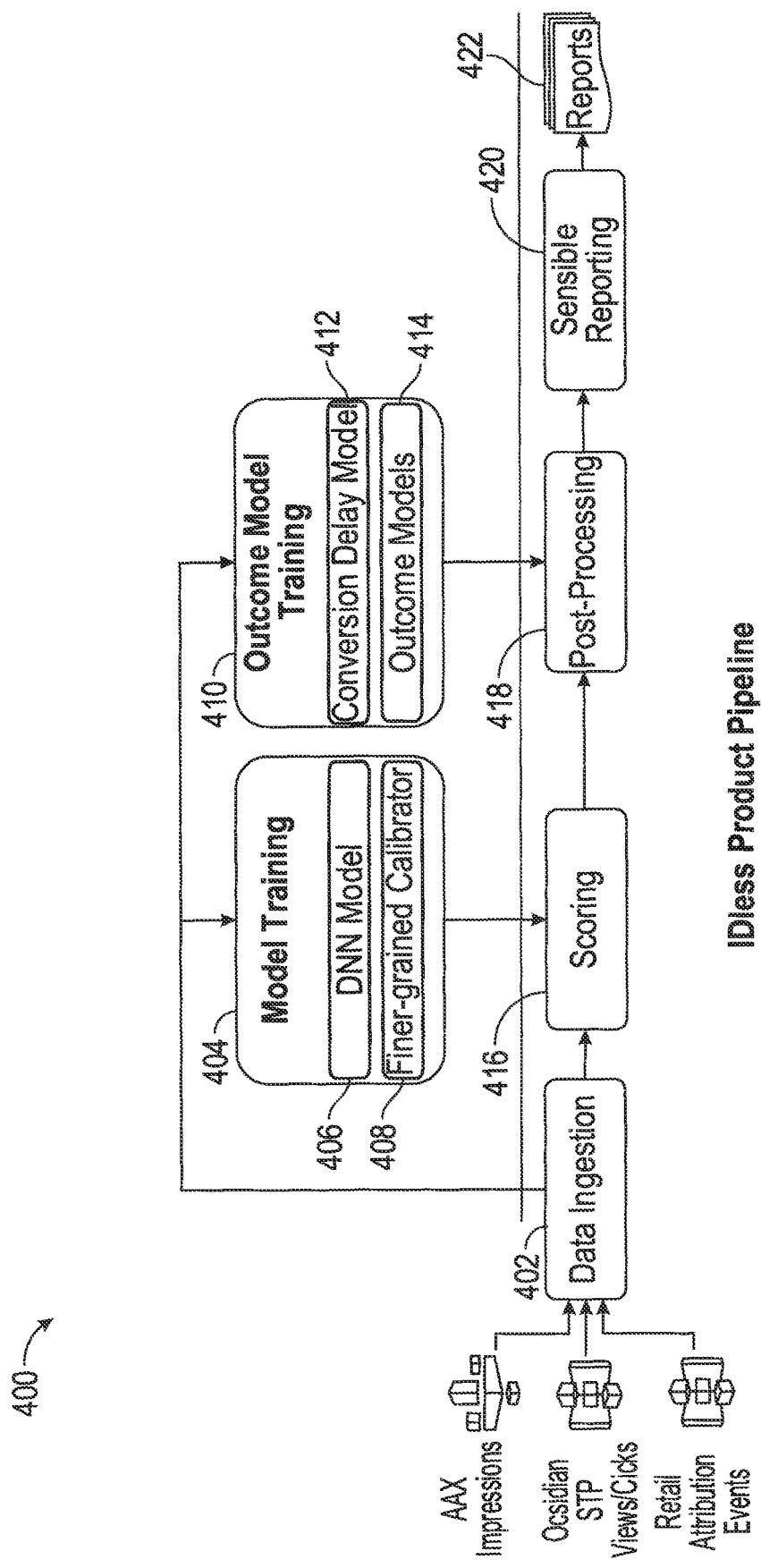
FIG. 4 depicts another example predicted conversions reporting flow diagram in accordance with one or more example embodiments of the disclosure.

FIG. 4 depicts another example predicted conversions reporting flow diagram 400 in accordance with one or more example embodiments of the disclosure. Generally, the flow diagram 400 may depict more specific operations performed by and/or based on outputs of any models described herein. Non-limiting examples of such operations may include predicting conversions and/or conversion outcomes and aggregating this predicted data for use in reports. In one or more embodiments, the flow diagram 400 may comprise a number of different operations, including at least data ingestion, data scoring, model training, outcome model training, post-processing, and reporting. The flow diagram 400 is not intended to be limiting, and the methods described herein may also include any other associated operations as well.

Operation 402 involves data ingestion, which may involve receiving any number of different types of input data. For example, the input data may include impressions data. The impressions data may indicate any user views of one or more advertisements. The impressions may be performed through any number of different types of devices. For example, a user may view an advertisement while using a smartphone application, while browsing a website on a desktop or laptop computer, while watching a streamed television show on a smart television, etc.

In some cases, the impressions data may be associated with one or more user identifiers (for example, cookies and/or any other types of user identifiers), such that each individual impression may be associated with a particular user. For example, a cookie may be stored for a user when the user visits a particular website. When the user views an advertisement on the website, the cookie may be used to associate that advertisement view with the specific user. However, some or all of the data may also not be associated with any user identifiers as well. For example, a second user may visit the same website and may view the same advertisement. However, a cookie may not be stored for the user, so the view of the advertisement may not be associated with the second user. The cookie may not be stored for the user for any number of reasons, such as the user browsing the website in an incognito mode, the user not accepting use of cookies, etc. As aforementioned, the user identifiers are not intended to be limited to cookies, and any mention of cookies is merely exemplary.

The input data may also include conversion data, which may indicate any purchases of products associated with any of the advertisements. Like the impression data, the conversion data may be associated with one or more user identifiers, however, some or all of the data may also not be associated with any user identifiers as well. The input data may also include any other types of data, such as a data indicating whether an impression has an associated conversion within an attribution window.

In one or more embodiments, the impression data and conversion data may be combined to form integrated data. The integrated data may also be aggregated into featurized data for a product goal (mshop versus id-less). Integrated data may integrate the impression data and conversion data together. For example, in a database, one row may be provided for each impression and conversion pair. Featured data may be data that is aggregated over the integrated data. For example, a row may represent a single impression. Features may be built that are ready to be consumed for ML training and scoring. For example, a variable may be established to indicate whether an impression has a conversion within its conversion window.

The featurized data may be used as an input to generate training, testing, calibration, and/or scoring datasets for the "mshop" model and for the "id-less" model separately. The "mshop" model aims to produce reports for id-has traffic that may not otherwise rely on deterministic conversions for any number of reasons. Instead, the mshop machine learning model is built using impacted id-has traffic and impacted conversions as training data. The trained model is used to provide conversion estimates for the id-has impacted traffic. This model may not necessarily require adjustments for covariate-shift and concept-shift. The "id-less" model may use id-has impressions and corresponding conversions as training data. A model may be trained with covariate-shift and concept-shift adjustments. The trained model may be used to score for id-less impressions.

Due to data sparsity, a negative down-sampling technique may be applied to increase the ratio of positive to negative samples when generating training and testing datasets. The original ratio of positive to negative samples may be maintained in the calibration dataset. To deal with changing traffic and changing science definition of the training/scoring data scope, two flags, one indicating that data is id-has data and one indicating that data id-less data, may be used to identify training data versus scoring data for the id-less model.

Operation 404 involves model training. The model training may be performed, in one or more embodiments, using one or more Deep Neural Network (DNN) model(s) 406 and one or more calibration segments 408. The DNN model(s) 406 may be used to predict the conversion probability for each advertisement impression. This prediction may be a value indicating that either a conversion has occurred or a conversion has not occurred. In order to obtain a confidence interval for model predictions, multiple DNN models may be trained using multiple datasets from training data. While reference is made to a DNN model, any other type of model may also be used as well.

In the calibration segment 408, a Platt Scaling model may be used to calibrate predictions conducted by the DNN model(s) 406 back to an actual distribution. For instance, a negative down-sampling technique may be used to adjust the ratio of positive and negative samples into 1:10 (or any other ratio) in the training dataset. The trained model may predict values in the magnitude of 0.01 (or any other value). The calibration segment 408 may calibrate these predictions back to their true magnitude of 0.001 (or any other value). In addition to this impression-level calibration described above, report-level calibration may also be performed.

Operation 410 involves outcome model training. The outcome models may include two types of post-processing models: outcome mapping models 414 and conversion delay models 412. The outcome models 414 may be used to transform the predicted conversion probability (for example, $p(y>0|x)$) output from the DNN model 406 to any expected conversion outcomes. The conversion outcomes may include any other information associated with the predicted conversion beyond simply whether the conversion is predicted to occur. Non-limiting examples of conversion outcomes may include conversion counts, units, and purchase amount. The conversion delay model 412 may estimate the distribution of the count outcome scattering outcomes (e.g., conversion counts) across days in a conversion attribution window (typically 14 days or any other time period. Assuming that these two processes are independent, estimations may be obtained for outcome "n" (e.g., conversion count) at a conversion date "t" through the multiplication operation $E[Y=y, T=t|x]=Mn \times Mt \times p(y>0|x)$, where Mn is used to transform from the converting probability $p(y=1|x)$ to the expected count outcome $E[N|y=1,x]$, and Mt is used to scatter the count output across days: $E[N|T,x]$. N here refers to conversion count, units purchased, or purchase amount.

In some cases, these post-processing models (outcome mapping models 414 and conversion delay models 412) may be segment-based following a hierarchical order, such as adId→campaignId→advertiserId→global. The segment is defined as granularities, which can be advertisement identifier, advertisement campaign identifier, advertisement identifier, or a global identifier. For each segment, corresponding outcome mapping and conversion delay models may be generated. Given an impression with a score, models at the finest segments (for example, advertisement identifier) may be used first. If the observed data is not large enough (e.g. observed conversion count is less than or equal to 2), models for the coarser segments (for example, advertisement campaign identifier or advertiser identifier) may instead be used. If corresponding models still cannot be found, a global model may be adopted to map a score to corresponding conversion outcomes across the attribution window.

Additionally, in contrast with an approach involving decomposing the modeling to three sub-models (for example, conversion probability model, outcome model and conversion delay model) and training them separately, some or all of the different models may be trained in parallel to directly optimize the final goal $E[y|x, t<=T]$ at the impression-level.

To apply these trained models to the id-less data, one approach is to use the id-has data for training and then use the models to directly predict conversions for the id-less data. However, there may be a self-selection bias associated with the id-has data, which may result in a distribution shift between the id-has and id-less data. To address this problem, two solutions may be used to model attributed conversions for unrecognized data (id-less data). Double machine learning (DML) utilizes a propensity score to adjust attributed conversions predictions on recognized traffic (id-has) to unrecognized traffic (id-less), whereas a Covariate-shifting model (CSM) adjusts the distribution of recognized traffic toward unrecognized traffic with propensity score and predicts unrecognized attributed conversions.

Operation 416 involves scoring the impressions. Scoring may involve providing impression data to machine learning model(s) to obtain a predicted probability that an impression may have an associated conversion event within an attribution window. An example scoring window may be defined as [T−14, T−1] assuming the current day is defined as "T." An example scoring value output may be a value between 0 and 1, where a value closer to 1 may indicate a higher probability that a conversion event may occur within the attribution window. However, any other type of output may be produced to represent the probability as well. In some instances, the models may be trained daily and data may be scored daily (or at any other intervals). In the reporting time, the score from the latest model may be used. The modeled result and the associated quality may dynamically adjust.

Operation 418 involves post-processing. The post-processing may involve applying the input data to the conversion delay model 414 and the outcome model 412. This may allow predicted conversion counts to be obtained by considering conversion delays. For instance, an impression "v" may be scored as "yv" as the predicted conversion probability. The outcome (count) model denoted as θ may first be used to map "yv" to corresponding conversion count θ (yv)=yc. Following this, the conversion delay model denoted as Φ may be applied to map the estimated conversion count yc to counts Φ(yc)=[yc_in_day1, yc_in_day2, . . . , yc_in_day14] over the attribution window.

Operation 420 involves generating one or more reports 422. The one or more reports may include aggregated conversion predictions and conversion outcomes. The reporting may be designed to provide the safeguard of a report from the customer's perspective. For example, the report may indicate whether the reported total attributed conversions, including both the deterministic and the modeled are below the total retail sale at brand and product level. The report may enforce this constraint through scaling down the estimate when a violation occurs. The report may also ensure that the estimated conversion rate is "reasonable" based on predefined rules established by experience. For example, a rule may require the purchase conversion rate to be less than 1% if it is not expected that an advertisement campaign will have a high conversion rate.

Figure 5:
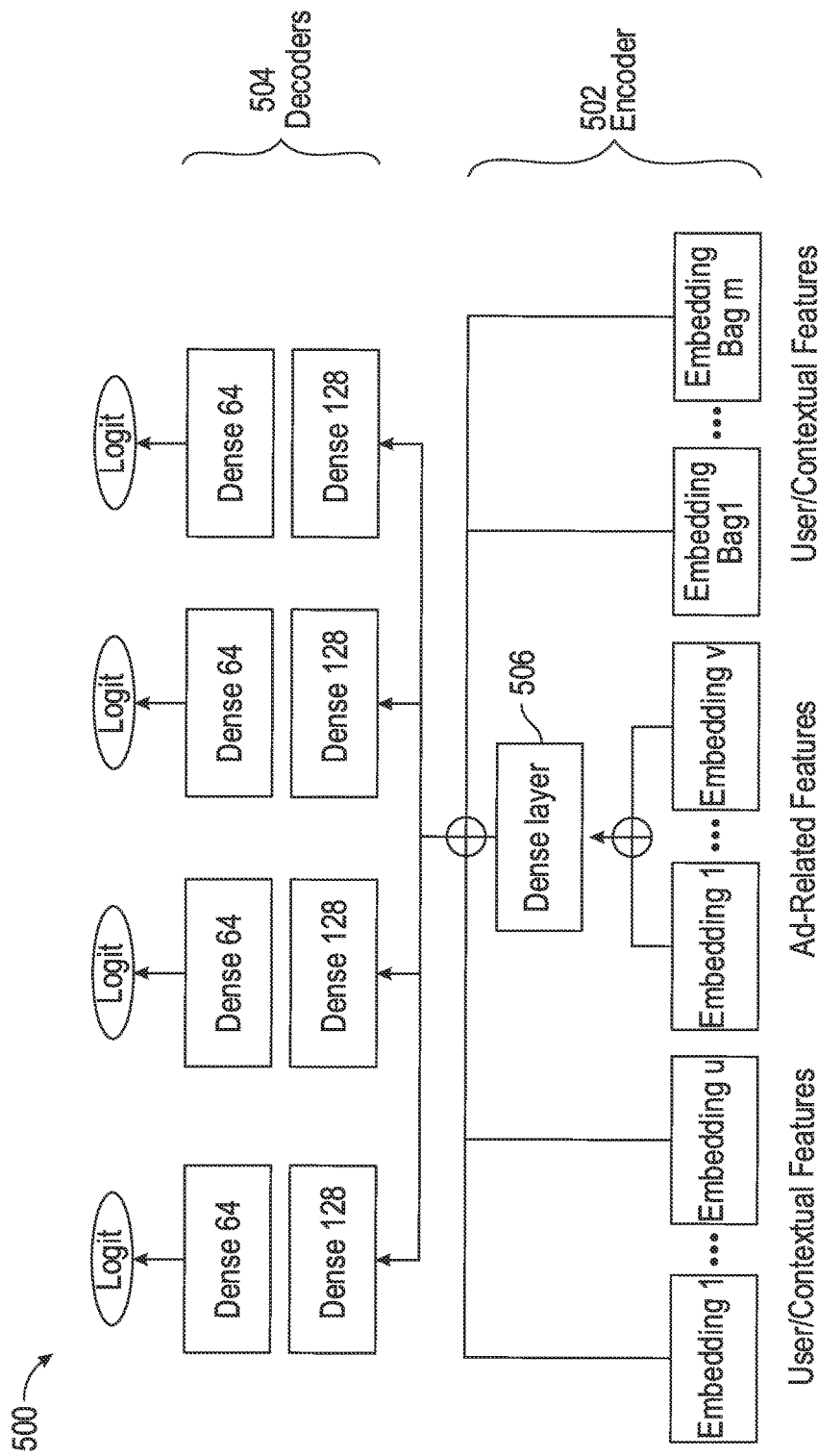
FIG. 5 depicts an example multitask learning model architecture in accordance with one or more example embodiments of the disclosure.

FIG. 5 depicts an example multitask learning model architecture 500 in accordance with one or more example embodiments of the disclosure. Multitask learning presents an approach to limit the model count growth by learning the different prediction tasks jointly via a single model. Multitask learning is a framework for improving generalization by sharing model parameters and input among multiple prediction tasks. At inference time, because pAction models are matched with advertisements based on the goal optimization type (e.g., purchase optimized advertisements are evaluated by purchase pAction models), the test distribution may be comprised of impressions with the same goal optimization type as the prediction goal. Thus, a multitask learning approach may be established to ensure that improved generalization and robustness do not come at the expense of test performance.

FIG. 6 depicts an example of deep neural network (DNN) architecture 600 in accordance with one or more example embodiments of the disclosure.

For both the conversion prediction model and the propensity score model (and/or any other model described herein), the same DNN may be used, with the expectation of different inputs being used for the models (however, in some cases, different DNNs may also be used). The output of the DNN may be a value either indicating a predicted conversion or a predicted non-conversion. For example, a value of "0" may indicate a prediction that a conversion will not occur, and a value of "1" may indicate a prediction that a conversion will occur (or has occurred). However, this is just one example of the types of values that may be output, and the indications may be provided in any other form as well.

In one or more embodiments, the DNN architecture 600 may comprise three portions. A first portion may include feature inputs. The inputs to the model may include categorical features 604 (for example, an advertisement identifier, an advertiser identifier, etc.) and/or numerical features 606.

A second portion may include embedding and normalization layers 604. The embedding and normalization layers 604 may transform categorical features into real-valued dense vectors. All of the embedding vectors may be concatenated into vectors to be provided to the third portion 606 of the DNN architecture 600. In some cases, three hidden layers may be used, where the hidden size may be set to [256, 64, 16] with ReLU activation, for example.

Embedding is a technique to encode the categorical variables. For example, a variable representing an identifier for advertisements may have millions of values. This variable may be encoded into a vector with length "K." for example, K=3, variable=1 has embedding vector1 (0.1, 0.2, −0.2); variable=2 has embedding vector2: (−0.1, 0.1, 0.3). The embedding vector may be thought of as the representation of a variable value and may be trained in the neural network.

A third portion may include a full connection layer 606. The full connection layer may include ReLU activation and sigmoid activation. The ReLU activation may be a function that returns a value of "0" if the function receives any negative input. However, if the function receives any positive value, then the function returns that value. The ReLU activation assists the DNN in accounting for variable interaction impacts and non-linearities.

The sigmoid activation may be used for the conversion prediction output. In some cases, the conversion prediction model and propensity score model may be trained separately without any weight sharing. Additionally, the third portion may include three hidden layers (for example, 256, 64, 16 with ReLU activation). The ratio of dropout may be set to 0.5 for all three hidden layers. The number of epochs may be set to five. The learning rate may be set to 0.001. However, any other values for the hidden layers, epochs, and learning rate may also be used.

In some cases, models that are not calibrated may have less accurate estimations for class probabilities, especially when applying sampling techniques on the imbalanced data (e.g., negative down-sampling technique applied to scale and improve efficiency of model training). Therefore, calibration may be used to reflect the likelihood of true events. The calibration may include two components: (1) impression-level calibration and (2) report-level calibration. The impression-level calibration may involve calibrating the predicted probability for each impression. The report-level calibration may involve adjusting the predicted probability of a view based on aggregated performance from all views in its associated ad-line, which is a unique module for accurate reporting.

In one or more embodiments, Platt Scaling may be used for the calibration. Platt Scaling trains a logistic regression model on a classifier's predicted probabilities (widely adopting logits) with class labels. Given a classifier's predicted probability f(x), Platt Scaling is able to produce a calibrated estimation as: $p(y=1|x)=1+exp(w*f(x)+b)1$.

In order to enhance the report-level model performance, the Platt Scaling may be extended to the finer-grained version by adding one-hot encoded advertisement identifier into f(x). Given that, the dimension of x may become N+1, where N is the number of advertisement lines and 1 refers to logits.

The report-level calibration may adjust calibrated probabilities of impressions in an advertisement line based upon the report-level prediction error between predicted conversions and ground truth in the observations (or training data) as shown in Equation 7 above, where $\Theta_i$ is the updated conversions by taking into account the report-level adjustment, EM is the empirical mean operator on the calibration dataset, and T is denoted as the calibration window that is a time period (e.g., 7 days, 14 days, and/or any other number of days).

Any number of different categorical features may be used in the modeling as presented in the table below. Examples of such features may include an advertisement identifier, an advertiser identifier, an advertisement campaign identifier, a demand channel code (for example, the specific channel or tools that an advertiser uses to establish an advertisement campaign, such as self-service, managed service, etc.), a creative identifier (for example, images and/or words of the advertisement), a date identifier, a day of the week, a type of web browser used to view an impression and/or purchase a product, a type of device, an operating system of the device, a website identifier, a source of the advertisement (for example, publisher, etc.), and/or any other types of features.

Figure 7:
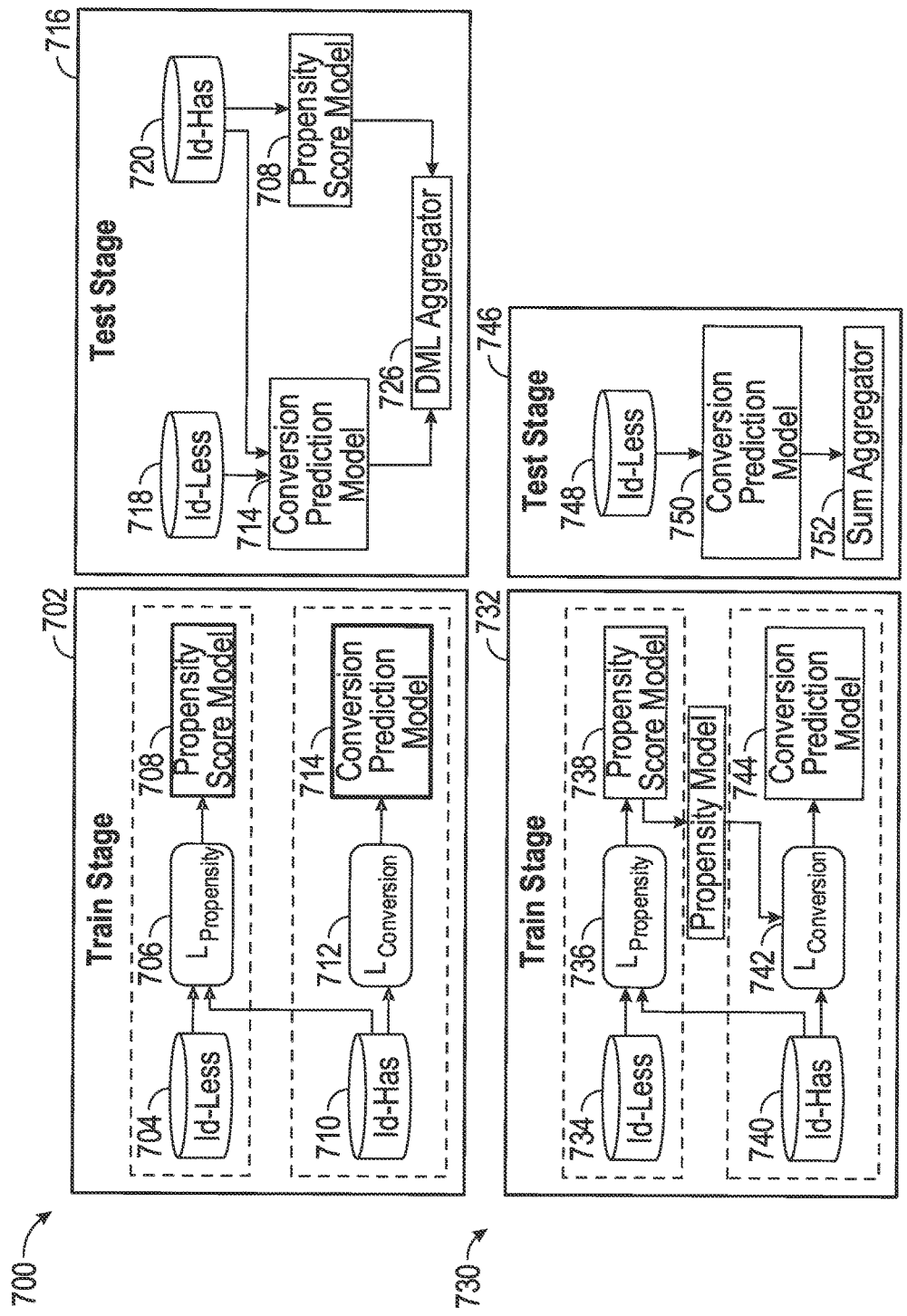
FIG. 7 depicts example flow diagrams for propensity score models and conversion prediction models in accordance with one or more example embodiments of the disclosure.

FIG. 7 depicts example flow diagrams for propensity score models and conversion prediction models in accordance with one or more example embodiments of the disclosure. The propensity score model may be trained using id-less and id-has data in the training stage. The conversion model may also be trained using id-has data. In the test stage, both the propensity score model and conversion outcome model may be scored using id-less and id-has data. Finally, a DML aggregator may be used to obtain the reporting-level modeled conversions.

The flow diagram 700 shows the training and scoring stages for a DML solution. In the training stage, the id-less data 704 and id-has data 710 may be provided to the propensity score model 708 for training. Additionally, the id-has data 710 may be provided to the conversion prediction model 714 for training as well. At the scoring stage, the id-less data 718 and id-has data 720 (which may be the same as or different than id-less data 704 and id-has data 710) may be provided to the propensity score model 708, and the id-has data 710 may be provided to the conversion prediction model 714. The outputs of both of these models may be provided to a DML aggregator 725. The DML aggregator 725 may solve for the second term of Equation 2 provided above. Cross-entropy loss (for example, propensity loss 706) may be used to train the propensity score model based on Equation 3. The conversion prediction model may also be trained based on a loss function as well (for example, conversion loss 712).

The flow diagram 730 shows the training and scoring stages for a CSM solution. In the training stage, the id-less 734 and id-has data 740 may be provided to the propensity score model 738 for training. Additionally, the id-has data 740 may be provided to the conversion prediction model 744 for training as well. In contrast with the DML solution shown in flow diagram 700, the training stage of the CSM solution may also involve providing a propensity score from the propensity score model 738 to the conversion prediction model 744. At the scoring stage, the id-less data 748 may be provided to the conversion prediction model 750. The output of the conversion prediction model 750 may be provided to a sum aggregator 752. Cross-entropy loss (for example, the propensity loss function 736) may be used to train the propensity score model based on Equation 3. The conversion prediction model may also be trained based on a loss function as well (for example, the conversion loss function 742).

Figure 8:
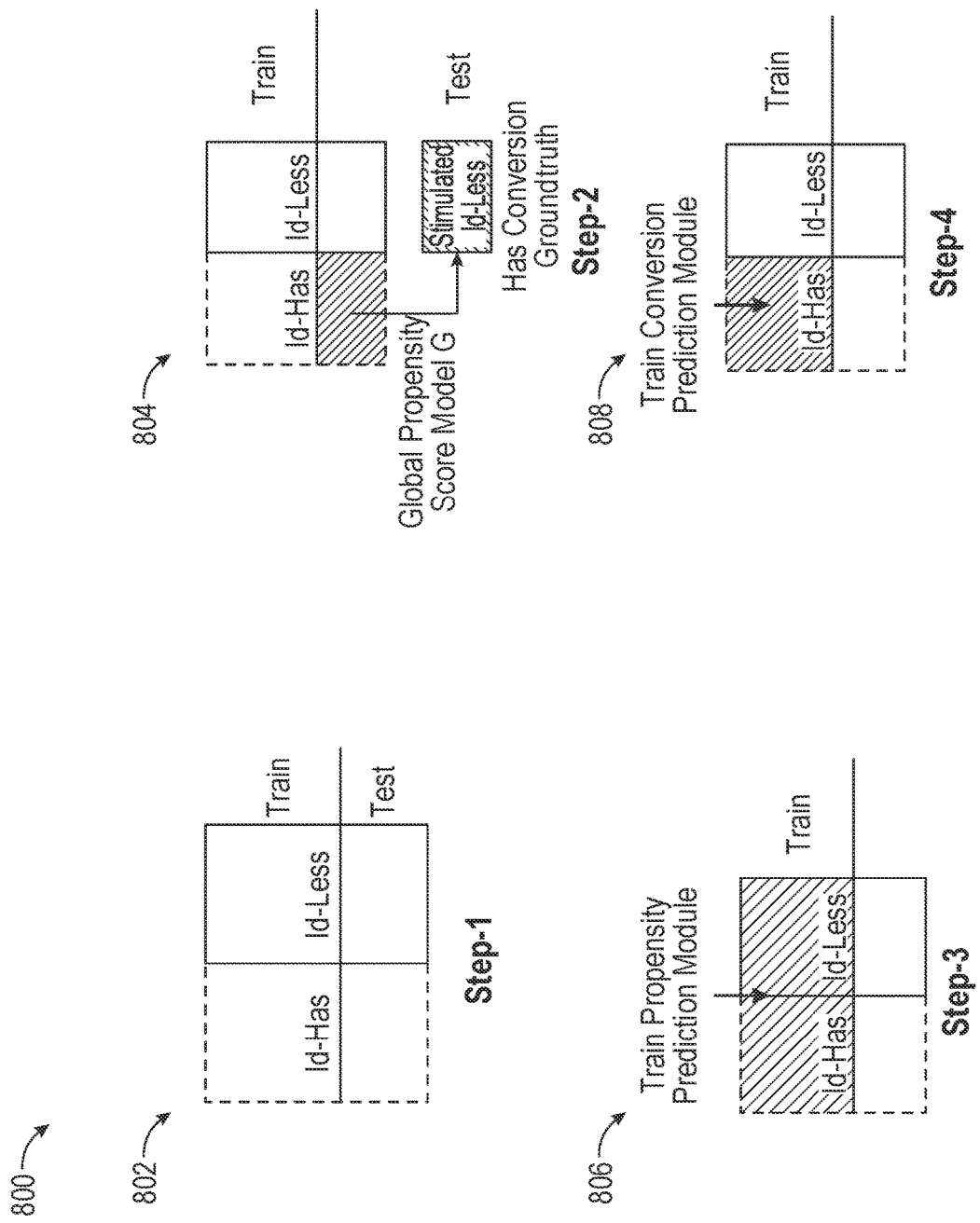
FIG. 8 depicts an example model training flow diagram in accordance with one or more example embodiments of the disclosure.

FIG. 8 depicts an example model evaluation flow diagram 800 in accordance with one or more example embodiments of the disclosure. The flow diagram 800 visually illustrates how different types of data may be used to train and/or test any of the models described herein or otherwise. Operation 802 shows an overall data set being separated into a first data subset including id-has data and a second data subset including id-less data. Particularly, training a global propensity score mode using DNN with four folds cross-fitting on both id-has and id-less traffic in the dataset. Splitting the dataset into training and testing datasets (50-50 splits or any other split) for id-has and id-less traffic, respectively. Operation 804 shows the generation of a simulated id-less test data set from the test split of id-has using a global propensity score model. Generating simulated id-less testing data with conversions from the id-has testing dataset via the global propensity score model trained by all data (the propensity score is a sufficient statistic to a id-less/id-has binomial distribution). Operation 806 shows the propensity prediction module being trained using both the first data subset and the second data subset. Operation 808 shows the conversion prediction model being trained using the first data subset.

FIG. 9 depicts example data shifts in accordance with one or more example embodiments of the disclosure. This figure illustrates two examples of covariate shifts in which the data distributions for id-has and id-less data are shifted. Dataset 900 shows distributions of operating systems for devices used to view an advertisement and/or perform a conversion. The dataset 900 includes distributions for id-has data and id-less data. As shown in the figure, the distribution for the id-less data includes a larger number of devices with iOS operating systems. Similarly, dataset 910 shows distributions of Internet browser types used to access the advertisements and/or perform the conversions. The dataset 910 shows a larger number of iOS-based browsers for the id-less data. These datasets are merely exemplary, and similar distribution shifts may also be applicable to any other type of data.

Figure 10:
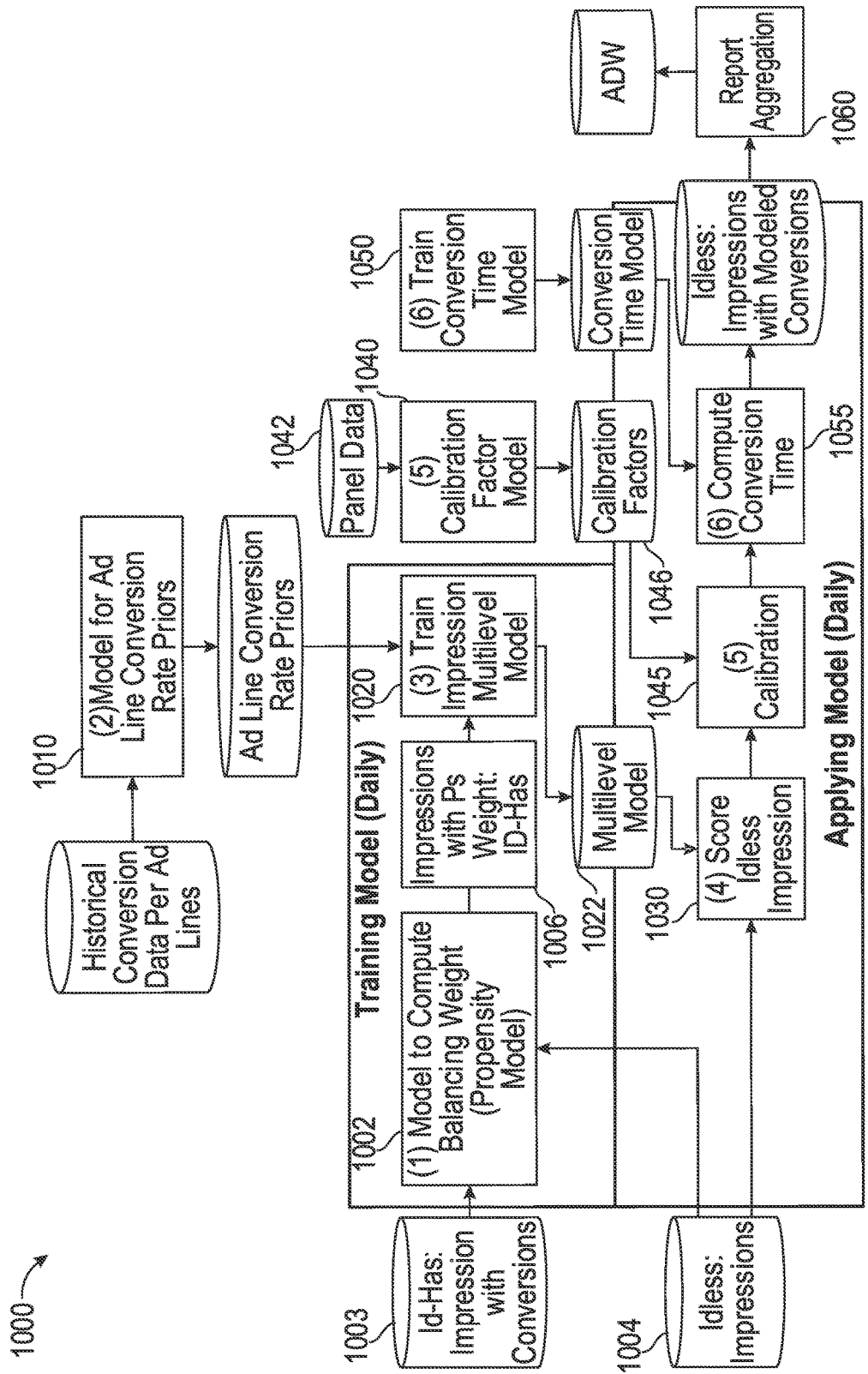
FIG. 10 is another example conversion modeling and reporting flow diagram in accordance with one or more example embodiments of the disclosure.

FIG. 10 is another example conversion modeling and reporting flow diagram 1000 in accordance with one or more example embodiments of the disclosure. The flow diagram 1000 may include some similar operations as the flow diagram 400, with additional elements. For example, the flow diagram 1000 depicts panel data being provided to a calibration factor model to account for concept shifts as discussed herein. Panel data help to adjust for the concept shift and adjust for concept shift. The flow diagram 1000 also shows the propensity model 1000 used to computing weighting values. The flow diagram 1000 also highlight how prior knowledge may be incorporated into the modeling.

Operation 1002 of the flow diagram 1000 involves using a model to compute balancing weight (for example, the propensity model as described herein). Operation 1002 may be performed using any number of different types of input data, such as id-has data 1003 and id-less data 1004. There are multiple methods for balancing. One approach is to build the propensity model with a logistic regression. $e_i=Pr(z_i=1|x_i)$, where i indexes an impression, and $z_i$ is an indicator for whether the i-th impression is in training data (aka id-has from opts-in users). Balancing weight is equal to $b_i=(1-e_i)/e_i$. As one example, a set of training data may include 60% of a first type of device and testing data may include only 20% of the first type of device. That is, every three impressions performed using the first type of device in training corresponding to one of the first types of device in testing. Thus, the balancing weight may be set to ⅓ for impressions to make the training data look like the testing data.

Operation 1010 involves using a model for advertisement line conversion rate historical data. The model may involve the use of historical conversion data per advertisement lines. An advertisement line may include one line of detail on either an insertion order or within an advertisement server, for example. As the information may be displayed in the form of a table, an advertisement line may represent one row of that table and may include a set of targeting details for an advertisement. One model to learn prior conversion rate of ad line is through an advertisement line level model includes:

$$Y0j=A(Uj;\alpha)+\eta jY0\_j=A(\backslash pmb\{U\_j:\backslash alpha\})+\backslash eta\_jY0j=A(Uj;\alpha Uj;\alpha)+\eta j. \quad \text{(Equation 14)}$$

The value "j" indexes an advertisement line. The value "$Y0_j$" includes prior conversion rate for the j-th advertisement line. The value "$U_j$" is the ad line level predictor. An advertiser may establish an advertisement campaign by specifying operation parameters. For example, optimization type may specify the optimization goal, such as maximizing CTR, maximizing ROAS, etc. Targeting type may define whether a campaign uses behavior targeting, contextual targeting, etc. Frequency type may define the frequency of advertisements (for example, serving ads no more than 3 times per day). These predictors may be available prior to campaign running. The value "A( )" may be the model form.

One example choice is the Binomial GLM (or logistic regression). The value "$\eta_j$" may be any noise.

Operation 1020 involves training an impression multilevel model 1022. The impression multilevel model 1022 may receive as inputs the weighted impressions 1006 output from operation 1002 and the advertisement line conversion rate prior output from operation 1010.

The multilevel model 1022 may be used to predict impression-level conversions. The multilevel model 1022 (as opposed to the single level model) may consider the prior knowledge of conversion rate of an advertisement line. During the warm-up period of an advertisement campaign, the observed conversions may be small or even zero. Thus, the model may rely more on the prior data to perform predictions. As observed conversions are accumulated, the influence of the prior data may be reduced in the model predictions.

The impression-level model may be defined as $logit(y_i) = X_i w + a_{j[i]} + y_i$. The variable "i" may be an index of an impression, and "j" may be index an ad line. The value "j[i]" may refer to the ad line that the i-th impression is belong to. The value "$y_i$" may refer to individual outcomes (for example, an indication of whether an impression has a conversion). $X_i$ may refer to predictors of the i-th users. The value "w" may refer to coefficients or, in general, model parameters to be learned from data. The value "$\alpha j[i]$" may be a coefficient (parameter) of the ad line of the i-th impression. It should be noted that any classification model may be used. Other example alternatives may include deep learning (neural network), xgb, random forest, etc.

A line level model may assist in incorporating any prior knowledge. The value "$\alpha j$" may be the line level variable that can be further specified as: $\alpha j \sim N(\mu_{0j}, \sigma_{0j})$. Depending on data and scalability constraints, other distributions like Beta over Gaussian may be considered. The value "$\mu_{0j}$" may represent the expectation of the prior (residual) conversion rate of the j-th ad line. The prior $Y_{0j}$ of conversion rate of the j-th adline may be computed. The following approximation may be used to construct the prior at the impression level: $\mu_{0j} \cong logit(\hat{Y}_{0j} - \Sigma_{i \in j\text{-}thline} X_I w / n_j$. The value "$\sigma j$" may refer to the variance of distribution can be predefined to encode our thoughts on how many observed conversions are 'safe' without leveraging prior. In some instances, a simple prior model (e.g., average conversion rate by some dimensions with high variance) may be used to start. As more data is obtained, more sophisticated prior models may be used.

This formulation may be different from the classic multilevel framework and the joint modeling fitting. The classic multilevel framework uses a $\alpha j \sim N(\mu_0, \sigma_0)$, in which to and $\sigma_0$ may be computed from training data that partially pools data from other ad lines. Conversion rates of advertisement lines may be heterogeneous with a wide range. In contrast, the joint learning approach may be more optimized but may suffer more computations and less flexibility in using information (such as practical knowledge, information has a longer history, and updates less frequently) outside of training data.

Additionally, to achieve the ad line level optimization and the balancing requirements, the sample weights for training may be computed as follows. First, propensity weight may be determined. Second, advertisement campaign weight may be determined. Impressions associated with a single advertisement campaign may have a total weight of "1," for example. Third, the class weight may be determined. Fourth, the final weight multiplied. Fifth, post-training calibration may be performed to deal with training and testing differences.

The model may be fitted through Baysian optimization library or through heuristic for better scalability. The full Bayesian model fitting has substantial progress but may still have a gap and require substantial computing resources. To go to market fast, heuristic methods may be used to produce a reasonable approximation first and then iterates.

Alternative methodologies may also be used. For example, a multilevel model aims to incorporate the prior conversion rate of ad lines. The multilevel model may require for predictions to be performed per impression prior. If the prior is specified at the line level, the impression-level prior may be obtained through approximation as described above. An alternative is to perform a single level model but perform a prior adjustment of outcomes at the line level. This may be performed as follows. First, estimate $y_i$ through $logit(y_i) = X_i w + a_{j[i]} + y_i$ defined above, treating the ad line intercept as a fixed effect. Second, perform the line-level estimate $\hat{Y}_j = \Sigma_{i \in j\text{-}thine} \hat{y}_i$. This, computes the adjustment ratio at the ad line level as $s_j = \hat{Y}'_j / \hat{Y}_j$, where $\hat{Y}'_j$ is equivalent to a Bayse update of $\hat{Y}_j$ using prior. Finally, apply the adjustment ratio to each impression in the ad line.

Compute the modeled conversions of id-less impressions. The model is applied to id-less traffic. The value i' may be used to index id-less impressions. The modeled conversion rate of id-less in the j-th line is $$\hat{Y}_j = \frac{1}{n_j} \Sigma_{i' - \in j\text{-}th} \hat{y}_{i'},$$

where $n_j$ is the number of idles impressions in the j-th line.

Operation 1030 involves scoring the id-less impressions. Scoring may involve providing impression data to machine learning model(s) to obtain a predicted probability that an impression may have an associated conversion event within an attribution window. An example scoring value output may be a value between 0 and 1, where a value closer to 1 may indicate a higher probability that a conversion event may occur within the attribution window. However, any other type of output may be produced to represent the probability as well. An example scoring window may be defined as [T−14, T−1], assuming the current day is defined as "T." In some instances, the models may be trained daily, and data may be scored daily (or at any other intervals). In the reporting time, the score from the latest model may be used. The modeled result and the associated quality may dynamically adjust.

Operation 1040 involves training a calibration factor model. Operation 1040 may involve calibrating predicted conversion probability of impressions $y_j$. One method for accomplishing this is to use panel data 1042 to compute the ratio of the id-less conversion rate over that of the id-has by dimensions (for example, optimization_type=CTR, brand=TV, wide audience targeting). Once the ratio is established, a linear adjustment may be performed as $\hat{Y}'_i = \text{factor} * \hat{Y}_i$. Based on operation 1040, operation 1045 may involve performing calibration based on calibration factors 1046 produced through operation 1040. Calibration may also be performed based on any other calibration methods described herein or otherwise.

Operation 1050 involves training a conversion time model and computing conversion times. The conversion time model may determine conversion times from their impression times. That is estimated conversion probability for every id-less impression at the impression time. A simple approach is to build a conversion time distribution by dimensions (e.g. optimization_type) and then run simulation to assign an attributed conversion to the future conversion time based on its impression time. Based on operation 1050, operation 1055 may involve computing the conversion time.

Operation 1060 involves preparing an aggregated report. This report may be the same as, or similar to, any of the reports described herein, such as, for example, the reports 306 of FIG. 3, the reports 422 of FIG. 4, and/or any other reports.

Illustrative System Architecture

Figure 11:
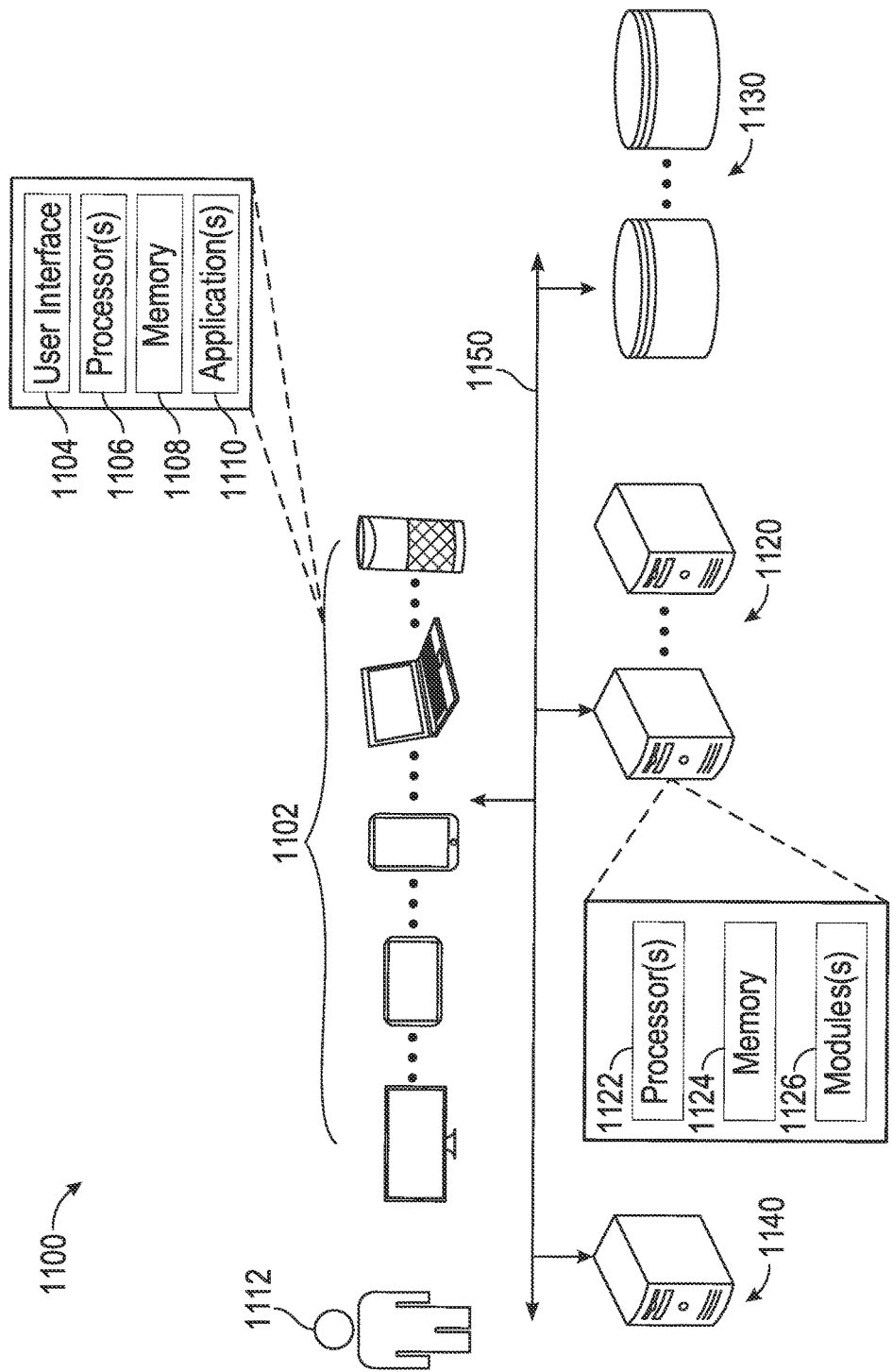
FIG. 11 is a schematic illustration of an example system in accordance with one or more example embodiments of the disclosure.

FIG. 11 is a schematic illustration of an example system 1100 in accordance with one or more example embodiments of the disclosure. In one or more embodiments, the system 1100 may include at least one or more user devices 1102, one or more servers 1120, one or more servers 1140, and/or one or more databases 1130. However, these components of the system 1100 are merely exemplary and are not intended to be limiting in any way. For simplicity, reference may be made hereinafter to a "user device 1102," a "server 1120," a "database 1130," and a "server 1140," however, this is not intended to be limiting and may still refer to any number of such elements.

The mobile device 1102 may be any type of device that is used by a user 1112 while browsing for products. For example, the user device 1102 may include a desktop or laptop computer, tablet, smartphone, and/or any other type of device. The mobile device 1102 may also include one or more processors 1106 and memory 1108. The mobile device 1102 may also include an application 1110 that may allow the user 1112 to view product advertisements, purchase products, and/or perform any other actions with respect to browsing for products. The products may be displayed to the user through a user interface 1104 of the mobile device 1102. Any dynamic product summary images that are generated in association with the application 1110 may also be presented through the user interface 1104. Additionally, while reference is made to a "mobile device," this may similarly apply to any other type of device as well.

The server 1120 may be a local or remote system that is used to perform any of the processing described herein (for example, server 1120 may host any of the model(s) described herein and/or may perform any of the operations described herein relating to predicting conversions, generating aggregated reports, and/or performing any other processes described herein or otherwise). The computing device 1120 may also include one or more processors 1122 and memory 1124. Any of the processes may be facilitated by one or more module(s) 1126.

The database 1130 may include any storage medium that may be used to store any of the date described herein or otherwise. For example, the database 1130 may store input data relating to user search queries, past search queries, product reviews, and/or any other input data. The database 1130 may also store any of the icons that are used to produce the dynamic product summary image. The database 1130 may also store pre-generated dynamic product summary images to recue the amount of processing time required to present dynamic product summary images that were previously presented.

The server 1140 may include a system associated with a third party that receives any of the information produced by the server 1120. For example, the server 1140 may be associated with an advertiser responsible for the advertisements associated with the impressions data and the predicted conversion outputs. Thus, the advertisers may be able to view the aggregated reports generated by the server 1120 to determine the effectiveness of the advertisement campaigns.

In one or more embodiments, any of the elements of the system 1100 (for example, the user device 1102, the server 1120, the database 1130, the server 1140, and/or any other element described with respect to FIG. 11 or otherwise) may be configured to communicate via a communications network 1150. Examples of communication networks are further described with respect to FIG. 12. Finally, any of the elements of the system 1100 may include any of the elements of the computing device 1200 as well.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 12:
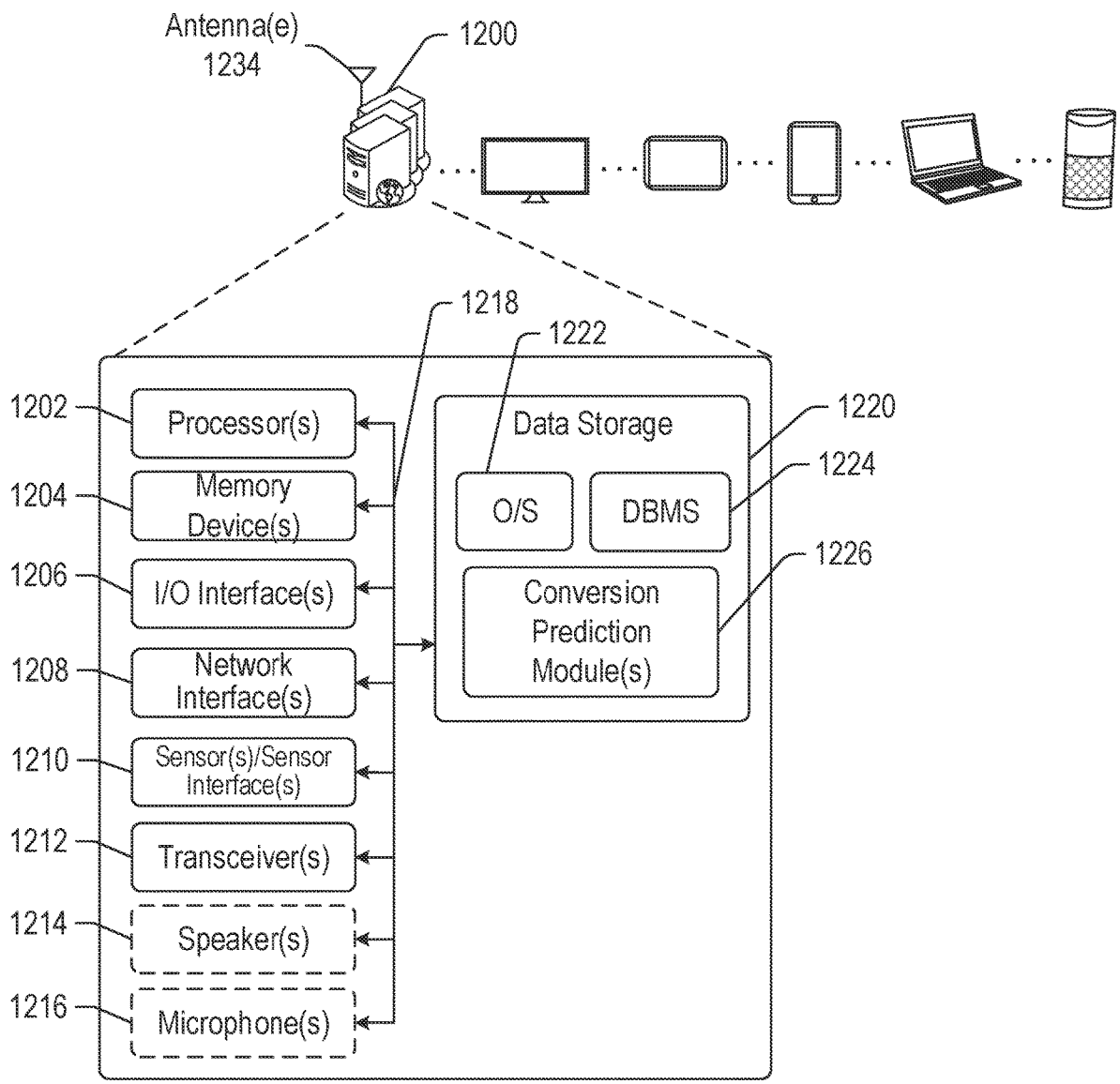
FIG. 12 is a schematic block diagram of an illustrative device in accordance with one or more example embodiments of the disclosure.

FIG. 12 is a schematic block diagram of an illustrative computing device 1200 in accordance with one or more example embodiments of the disclosure. The computing device 1200 may include any suitable computing device capable of receiving and/or generating data, including, but not limited to, a mobile device such as a smartphone, tablet, e-reader, wearable device, or the like; a desktop computer; a laptop computer; a content streaming device; a set-top box; or the like. The computing device 1200 may correspond to an illustrative device configuration for the devices of FIGS. 1-11.

The computing device 1200 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1200 may include one or more processors (processor(s)) 1202, one or more memory devices 1204 (generically referred to herein as memory 1204), one or more input/output (I/O) interface(s) 1206, one or more network interface(s) 1208, one or more sensors or sensor interface(s) 1210, one or more transceivers 1212, one or more optional speakers 1214, one or more optional microphones 1216, and data storage 1220. The computing device 1200 may further include one or more buses 1218 that functionally couple various components of the computing device 1200. The computing device 1200 may further include one or more antenna(e) 1234 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit exchange of information (e.g., data (including computer-executable code), signaling, etc.) between various components of the computing device 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1204 of the computing device 1200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory, such as a data cache, may be a multi-level cache organized as a hierarchy of one or more cache levels (L1, L2, etc.).

The data storage 1220 may include removable storage and/or non-removable storage including, but not limited to, magnetic storage, optical disk storage, and/or tape storage. The data storage 1220 may provide non-volatile storage of computer-executable instructions and other data. The memory 1204 and the data storage 1220, removable and/or non-removable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to memory 1204 for use by the processor(s) 1202 during the execution of the computer-executable instructions. Moreover, output data generated as a result of execution of the computer-executable instructions by the processor(s) 1202 may be stored initially in memory 1204, and may ultimately be copied to data storage 1220 for non-volatile storage.

More specifically, the data storage 1220 may store one or more operating systems (O/S) 1222; one or more database management systems (DBMS) 1224; and one or more program module(s), applications, engines, computer-executable code, scripts, or the like such as, for example, one or more conversion prediction module(s) 1226. Some or all of these module(s) may be sub-module(s). Any of the components depicted as being stored in data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in data storage 1220 may support functionality described in reference to correspondingly named components earlier in this disclosure.

The data storage 1220 may further store various types of data utilized by components of the computing device 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 12, the datastore(s) may include, for example, purchase history information, user action information, user profile information, a database linking search queries and user actions, and other information.

The processor(s) 1202 may be configured to access the memory 1204 and execute computer-executable instructions loaded therein. For example, the processor(s) 1202 may be configured to execute computer-executable instructions of the various program module(s), applications, engines, or the like of the computing device 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application-Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to functionality supported by the various program module(s) depicted in FIG. 12, the dynamic product summary image module(s) 1226 may include computer-executable instructions, code, or the like that responsive to execution by one or more of the processor(s) 1202 may perform functions including, but not limited to, performing any functionality associated with the dynamic product summary images as described herein, and the like (for example, receiving input data, identifying attributes, ranking attributes, generating icons, presenting the dynamic product summary image, and/or any other functionality).

Referring now to other illustrative components depicted as being stored in the data storage 1220, the O/S 1222 may be loaded from the data storage 1220 into the memory 1204 and may provide an interface between other application software executing on the computing device 1200 and hardware resources of the computing device 1200. More specifically, the O/S 1222 may include a set of computer-executable instructions for managing hardware resources of the computing device 1200 and for providing common services to other application programs (e.g., managing memory allocation among various application programs). In certain example embodiments, the O/S 1222 may control execution of the other program module(s) to dynamically enhance characters for content rendering. The O/S 1222 may include any operating system now known or which may be developed in the future, including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1200 is a mobile device, the DBMS 1224 may be any suitable lightweight DBMS optimized for performance on a mobile device.

Referring now to other illustrative components of the computing device 1200, the input/output (I/O) interface(s) 1206 may facilitate the receipt of input information by the computing device 1200 from one or more I/O devices as well as the output of information from the computing device 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more of the antenna(e) 1234 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1200 may further include one or more network interface(s) 1208 via which the computing device 1200 may communicate with any of a variety of other systems, platforms, networks, devices, and so forth. The network interface(s) 1208 may enable communication, for example, with one or more wireless routers, one or more host servers, one or more web servers, and the like via one or more of networks.

The antenna(e) 1234 may include any suitable type of antenna depending, for example, on the communications protocols used to transmit or receive signals via the antenna (e) 1234. Non-limiting examples of suitable antennas may include directional antennas, non-directional antennas, dipole antennas, folded dipole antennas, patch antennas, multiple-input multiple-output (MIMO) antennas, or the like. The antenna(e) 1234 may be communicatively coupled to one or more transceivers 1212 or radio components to which or from which signals may be transmitted or received.

As previously described, the antenna(e) 1234 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1234 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1234 may be configured to transmit or receive radio frequency signals within any suitable frequency range forming part of the unlicensed portion of the radio spectrum.

The antenna(e) 1234 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna(e) 1234—transmitting or receiving radio frequency (RF) signals in the bandwidth and/or channels corresponding to the communications protocols utilized by the computing device 1200 to communicate with other devices. The transceiver(s) 1212 may include hardware, software, and/or firmware for modulating, transmitting, or receiving—potentially in cooperation with any of antenna(e) 1234—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1212 may further include hardware, firmware, or software for receiving GNSS signals. The transceiver(s) 1212 may include any known receiver and baseband suitable for communicating via the communications protocols utilized by the computing device 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 1214 may be any device configured to generate audible sound. The optional microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the computing device 1200 may include alternate and/or additional hardware, software, or firmware components beyond those described or depicted without departing from the scope of the disclosure. More particularly, it should be appreciated that software, firmware, or hardware components depicted as forming part of the computing device 1200 are merely illustrative and that some components may not be present or additional components may be provided in various embodiments. While various illustrative program module(s) have been depicted and described as software module(s) stored in data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components, including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that, upon execution, may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving first input data comprising first advertisement impression data and first advertisement conversion data, wherein the first advertisement impression data indicates a user view of a first advertisement, wherein the first advertisement conversion data indicates a purchase of a product associated with the first advertisement, and wherein the first input data includes one or more user identifiers associated with both the first advertisement impression data and the first advertisement conversion data;
training a first machine learning model using the first input data;
receiving second input data comprising second advertisement impression data, wherein user identifiers are unavailable for the second input data;
determining, using the first machine learning model and based on the second advertisement impression data without user identifiers, a score for the second advertisement impression data, the score indicating a probability of an occurrence of a future conversion event;
predicting, using the first machine learning model and based on the score, second predicted conversion data indicative of an occurrence or nonoccurrence of the future conversion event;
calibrating the second predicted conversion data using a second machine learning model;
determining using a third machine learning model and a fourth machine learning model, a conversion outcome associated with the second predicted conversion data including at least one of: a conversion date, a number of products purchased, and a purchase amount;

generating an aggregated report including the second predicted conversion data; and sending the aggregated report to a third-party system.

2. The method of claim 1, wherein at least one of the: first machine learning model, second machine learning model, third machine learning model, and the fourth machine learning model comprise one or more neural network (DNN) models, wherein the one or more DNN models comprise at least one or more embedding and normalization layers, and one or more second layers including a rectified linear activation (ReLU) and sigmoid activation.

3. The method of claim 1, further comprising:
determining a difference between the first advertisement impression data and the second advertisement impression data, the difference indicative of a covariate data shift or a concept data shift; and
training the first machine learning model based on the covariate data shift or the concept data shift.

4. The method of claim 1, further comprising:
training the first machine learning model using a cross-entropy loss function.

5. A method comprising:
receiving first input data comprising first advertisement impression data and first advertisement conversion data, wherein the first input data includes one or more user identifiers associated with both the first advertisement impression data and the first advertisement conversion data;
training one or more machine learning models using the first input data to estimate probabilities of occurrences of future conversion events based on advertisement impression data;
receiving second input data comprising second advertisement impression data, wherein user identifiers are unavailable for the second input data;
determining, using the one or more machine learning models and based on the second advertisement impression data without user identifiers, a score for the second advertisement impression data, the score indicating a probability of an occurrence of a future conversion event; and
predicting, using the one or more machine learning models and based on a comparison of the score to the first advertisement conversion data, second predicted conversion data indicative of an occurrence or nonoccurrence of the future conversion event.

6. The method of claim 5, further comprising:
determining, using the one or more machine learning models, third predicted conversion data associated with third input data; and
generating an aggregated report including the second predicted conversion data and the third predicted conversion data.

7. The method of claim 5, further comprising:
determining a difference between the first advertisement impression data and the second advertisement impression data; and
training the one or more machine learning models based on the difference.

8. The method of claim 5, wherein the one or more machine learning models comprise a first machine learning model and a second machine learning model, wherein the first machine learning model is configured to train the second machine learning model.

9. The method of claim 8, further comprising:
training the first machine learning model using a cross-entropy loss function.

10. The method of claim 5, further comprising:
performing an impression-level calibration and a report-level calibration.

11. The method of claim 5, further comprising:
determining, using the one or more machine learning models, one or more conversion outcomes associated with the second predicted conversion data, the one or more conversion outcomes including at least one of: a conversion date, a number of products purchased, and a purchase amount.

12. The method of claim 5, wherein the one or more machine learning models comprise one or more neural network (DNN) models, wherein the one or more DNN models comprise at least one or more embedding and normalization layers, and one or more second layers including a rectified linear activation (ReLU) and sigmoid activation.

13. A system comprising:
at least one memory that stores computer-executable instructions; and
one or more processors configured to access the memory and execute the computer-executable instructions to:
receive first input data comprising first advertisement impression data and first advertisement conversion data, wherein the first input data includes one or more user identifiers associated with both the first advertisement impression data and the first advertisement conversion data;
train one or more machine learning models using the first input data to estimate probabilities of occurrences of future conversion events based on advertisement impression data;
receive second input data comprising second advertisement impression data, wherein user identifiers are unavailable for the second input data;
determine, using the one or more machine learning models and based on the second advertisement impression data without user identifiers, a score for the second advertisement impression data, the score indicating a probability of an occurrence of a future conversion event; and
predict, using the one or more machine learning models and based on a comparison of the score to the first advertisement conversion data, second predicted conversion data indicative of an occurrence or non-occurrence of the future conversion event.

14. The system of claim 13, wherein the computer-executable instructions are further configured to:
determine, using the one or more machine learning models, third predicted conversion data associated with third input data; and
generate an aggregated report including the second predicted conversion data and the third predicted conversion data.

15. The system of claim 13, wherein the computer-executable instructions are further configured to:
determine a difference between the first advertisement impression data and the second advertisement impression data; and
train the one or more machine learning models based on the difference.

16. The system of claim 13, wherein the one or more machine learning models comprise a first machine learning model and a second machine learning model, wherein the first machine learning model is configured to train the second machine learning model.

17. The system of claim 16, wherein the computer-executable instructions are further configured to:
   train the first machine learning model using a cross-entropy loss function.

18. The system of claim 13, wherein the computer-executable instructions are further configured to:
   perform an impression-level calibration and a report-level calibration.

19. The system of claim 13, wherein the computer-executable instructions are further configured to:
   determine, using the one or more machine learning models, one or more conversion outcomes associated with the second predicted conversion data, the one or more conversion outcomes including at least one of: a conversion date, a number of products purchased, and a purchase amount.

20. The system of claim 13, wherein the one or more machine learning models comprise one or more neural network (DNN) models, wherein the one or more DNN models comprise at least one or more embedding and normalization layers, and one or more second layers including a rectified linear activation (ReLU) and sigmoid activation.

\* \* \* \* \*